(12) United States Patent
Kulkarni et al.

(10) Patent No.: US 12,318,801 B2
(45) Date of Patent: Jun. 3, 2025

(54) FORCE-BALANCING SPRAY NOZZLE DEVICES

(71) Applicants: General Electric Company, Schenectady, NY (US); OLIVER CRISPIN ROBOTICS LIMITED, Altrincham (GB)

(72) Inventors: Ambarish J. Kulkarni, Glenville, NY (US); Andrew Crispin Graham, Badminton (GB); Byron A. Pritchard, Loveland, OH (US); Todd William Danko, Niskayuna, NY (US); Bernard P. Bewlay, Niskayuna, NY (US); Stuart James Briggs, Bristol (GB); Trevor Owen Hawke, Bristol (GB)

(73) Assignees: General Electric Company, Evendale, OH (US); OLIVER CRISPIN ROBOTICS LIMITED, Altrincham (GB)

( * ) Notice: Subject to any disclaimer, the term of this patent is extended or adjusted under 35 U.S.C. 154(b) by 407 days.

(21) Appl. No.: 17/986,202

(22) Filed: Nov. 14, 2022

(65) Prior Publication Data

US 2024/0157383 A1 May 16, 2024

(51) Int. Cl.
*B05B 7/08* (2006.01)
*B05B 13/04* (2006.01)
(Continued)

(52) U.S. Cl.
CPC ............ *B05B 7/08* (2013.01); *B05B 13/0431* (2013.01); *B05B 15/65* (2018.02); *B25J 9/06* (2013.01); *B25J 13/089* (2013.01)

(58) Field of Classification Search
CPC ....... B05B 7/08; B05B 15/65; B05B 13/0431; B25J 9/06; B25J 13/089
(Continued)

(56) References Cited

U.S. PATENT DOCUMENTS 4,274,591 A * 6/1981 Sunshine ............... A63H 29/10
239/251
4,403,985 A 9/1983 Boretos
(Continued)

FOREIGN PATENT DOCUMENTS

BR 9601132 1/1998
DE 102013202616 A1 8/2014
(Continued)

OTHER PUBLICATIONS

OC Robotics—TMCLK JetSnake; Dated Sep. 23, 2014, https://www.youtube.com/watch?v=Fi43dypYWp8; 7 pgs.
(Continued)

*Primary Examiner* — Steven J Ganey
(74) *Attorney, Agent, or Firm* — Fitch, Even, Tabin & Flannery LLP

(57) ABSTRACT

A spray nozzle includes a first conduit that provides a first flow path for a first type of fluid, a second conduit that provides a second flow path for a second fluid that is different from the first fluid, a first dispensing aperture that ejects therefrom a spray that includes the first type of fluid and/or the second type of fluid, and at least one balancing outlet in fluid communication with the second conduit. The at least one balancing outlet permit the second type of fluid to exit therefrom to balance a force of ejection of the spray from the first dispensing aperture.

20 Claims, 17 Drawing Sheets

(51) Int. Cl.
　　 *B05B 15/65* 　　(2018.01)
　　 *B25J 9/06* 　　(2006.01)
　　 *B25J 13/08* 　　(2006.01)

(58) Field of Classification Search
　　 USPC .... 239/211, 225.1, 237, 240, 251, 423, 424,
　　　　　　 239/548, 588; 134/167 C, 168 C, 169 C
　　 See application file for complete search history.

(56) References Cited

U.S. PATENT DOCUMENTS

| | | | |
|---|---|---|---|
| 4,518,120 A | | 5/1985 | Johnson |
| 4,735,501 A | | 4/1988 | Ginsburgh |
| 4,756,324 A | * | 7/1988 | Larsson ............... B08B 9/0495 |
| | | | 134/167 C |
| 4,826,087 A | | 5/1989 | Chinery |
| 4,991,957 A | | 2/1991 | Sakamoto |
| 5,765,756 A | | 6/1998 | Jordan |
| 6,866,106 B2 | | 3/2005 | Trueman |
| 7,033,979 B2 | | 4/2006 | Herwig |
| 7,083,011 B2 | | 8/2006 | Meyer |
| 7,559,487 B2 | | 7/2009 | Gressett, Jr. |
| 7,690,444 B1 | | 4/2010 | Watson |
| 8,028,936 B2 | | 10/2011 | McDermott |
| 8,277,647 B2 | | 10/2012 | Rice |
| 8,668,155 B2 | * | 3/2014 | Wright ................... B05B 15/18 |
| | | | 239/225.1 |
| 9,138,782 B2 | | 9/2015 | Dorshimer |
| 9,739,168 B2 | | 8/2017 | Ekanayake |
| 9,926,517 B2 | | 3/2018 | Tibbetts |
| 9,932,854 B1 | | 4/2018 | Tibbetts |
| 9,951,647 B2 | | 4/2018 | Rawson |
| 9,957,066 B2 | | 5/2018 | Bewlay |
| 10,005,111 B2 | | 6/2018 | Eriksen |
| 10,018,113 B2 | | 7/2018 | Bewlay |
| 10,227,891 B2 | | 3/2019 | Eriksen |
| 10,323,539 B2 | | 6/2019 | Bewlay |
| 10,377,968 B2 | | 8/2019 | Brooks |
| 10,385,723 B2 | | 8/2019 | Flynn |
| 10,634,004 B2 | | 4/2020 | Giljohann |
| 10,669,885 B2 | | 6/2020 | Pecchiol |
| 10,920,181 B2 | | 2/2021 | Martin |
| 11,027,317 B2 | | 6/2021 | Tibbetts |
| 11,441,446 B2 | | 9/2022 | Rawson |
| 11,465,165 B2 | | 10/2022 | Smoot |
| 2015/0159122 A1 | | 6/2015 | Tibbetts |
| 2017/0165721 A1 | | 6/2017 | Tibbetts |
| 2017/0167290 A1 | | 6/2017 | Kulkarni |
| 2017/0191376 A1 | | 7/2017 | Eriksen |
| 2017/0204739 A1 | | 7/2017 | Rawson |
| 2017/0254217 A1 | | 9/2017 | Eriksen |
| 2018/0149038 A1 | | 5/2018 | Eriksen |
| 2018/0155060 A1 | | 6/2018 | Dauenhauer |
| 2018/0216036 A1 | | 8/2018 | Tibbetts |
| 2018/0237163 A1 | | 8/2018 | Bewlay |
| 2018/0245477 A1 | | 8/2018 | Kulkarni |
| 2018/0258787 A1 | | 9/2018 | Tibbetts |
| 2018/0291803 A1 | | 10/2018 | Belay |
| 2018/0298781 A1 | | 10/2018 | Tibbetts |
| 2018/0313225 A1 | | 11/2018 | Millhaem |
| 2018/0355751 A1 | | 12/2018 | Tibbetts |
| 2019/0153890 A1 | | 5/2019 | Eriksen |
| 2019/0323378 A1 | | 10/2019 | Tibbetts |
| 2021/0108537 A1 | | 4/2021 | Rigg |
| 2021/0317752 A1 | | 10/2021 | Deja |

FOREIGN PATENT DOCUMENTS

| | | |
|---|---|---|
| DE | 102015006330 | 11/2016 |
| DE | 102020213695 | 6/2021 |
| EP | 1016469 | 7/2000 |
| KR | 20140099906 | 8/2014 |
| WO | 2020022474 A1 | 1/2020 |
| WO | 2020030516 A1 | 2/2020 |

OTHER PUBLICATIONS

OC Robotics successfully delivers new JetSnake system to Dragages/Bouygues joint venture in Hong Kong; https://www.ocrobotics.com/news-en/oc-robotics-successfully-delivers-new-jetsnake-system-to-dragagesbouygues-joint-venture-in-hong-kong/; which includes youtube link (Sep. 22, 2014) to—https://www.youtube.com/watch?v=AMd925MNO3g; 4 pgs.

* cited by examiner

FORCE-BALANCING SPRAY NOZZLE DEVICES

TECHNICAL FIELD

This disclosure relates to spray nozzles, more particularly, to spray nozzles including retro-jets that balance the forces exerted by the fluids passing through the nozzles.

BACKGROUND

In a typical process of spraying a solution or mixture from a spray nozzle, the spray exiting the spray nozzle exerts a reaction force on the spray nozzle. This can undesirably result in deflection of the spray nozzle from its intended position. Conventionally, the spray nozzle is anchored to a stiff structure capable of handling the reaction forces without significant deflection. In newer spray processes where a coating or a cleaning solution is sprayed onto an engine component, the spray nozzle is typically attached to an end of a slender cantilevered member not having the ability to absorb the reaction forces. This results in significant deflection and therefore inability of the spray nozzle to maintain its intended position, which is detrimental to the coating process, and can result in harm to other parts of the engine where spray deposition is undesirable.

BRIEF DESCRIPTION OF THE DRAWINGS

Described herein are embodiments of force-balanced spray nozzle devices. This description includes drawings, wherein.

Figure 1:
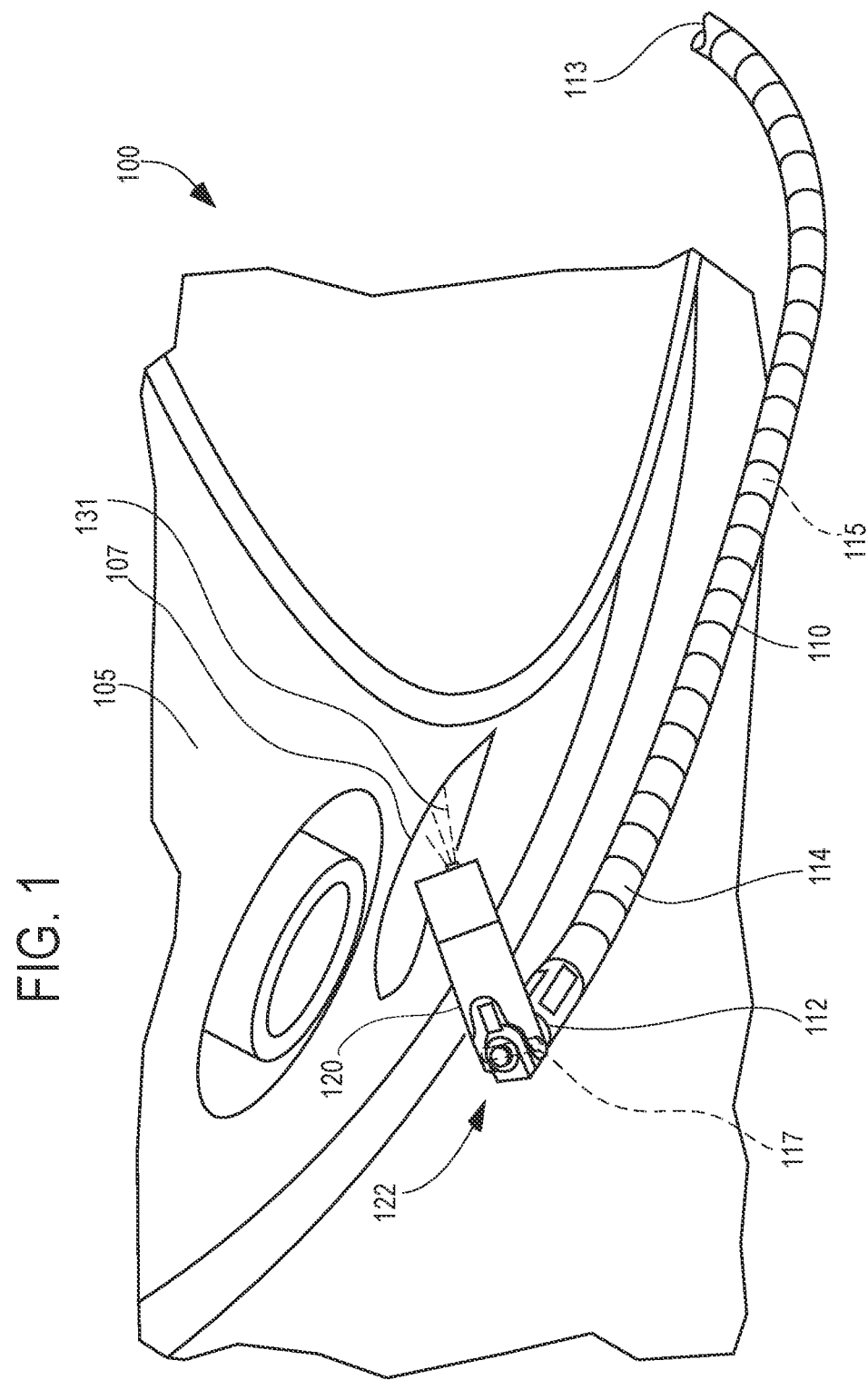
FIG. 1 is a perspective view of an embodiment of a spray nozzle that is coupled to a flexible robotic arm for spraying an engine component.

Elements in the figures are illustrated for simplicity and clarity and have not been drawn to scale. The dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

As used herein, the terms "first," "second," and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 5, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the spray nozzle devices described herein include a first conduit that provides a first flow path for a first type of fluid, a second conduit that provides a second flow path for a second type of fluid that is different from the first fluid, a first dispensing aperture that ejects therefrom an atomized multiphase spray that includes the first type of fluid and the second type of fluid, and at least one balancing outlet in fluid communication with at least the second conduit. The balancing outlets permit the second type of fluid to exit therefrom to balance a force of ejection of the atomized multiphase spray from the first dispensing outlet.

Advantageously, the spray nozzle devices described herein reduce the need for structural stiffness in the spray nozzle support and permit the spray nozzle to be coupled to an elongated, flexible slender robotic arm while relying on balancing the reaction forces within the spray nozzle by using one or more of the fluids passing through the spray nozzle to exert a balancing force by exiting the fluids through one or more of the force balancing outlets. Notably, the flexibility of the robotic arm described herein is desirable and deliberate and advantageously permits the robotic arm to reach hard-to-reach areas of an engine, but flexibility of conventional robotic arms may be an undesirable consequence of their slenderness and/or light-weight construction. The precision to balance the reaction forces by the balancing force may depend on a stiffness and/or damping characteristic of the supporting structure or robotic arm or a static and/or dynamic response of the supporting structure or robotic arm in response to a perturbation.

The precision may also relate to a positional precision associated with a process or task being performed. In some embodiments, the balancing of the forces within the spray nozzle may be aided by a sensor-based closed-loop controlled metering mechanism that measures the position and/or velocity and/or acceleration of the spray nozzle or a part of an assembly connectively coupled to the spray nozzle and adjusts the fluid balance between the multiphase atomized fluid being ejected from the dispensing outlet and the fluid being ejected from the force balancing outlets (also referred to as a retro-jets) so as to respond to the measured position and/or velocity and/or acceleration in order to control the motion. In certain aspects, one of the fluids (e.g., air, nitrogen gas, etc.) accelerates another fluid (e.g., viscous slurry, aqueous solution, etc.) and also achieves atomization of the other fluid, such that the controlled metering mechanism takes into account the properties of the secondary fluid and its feed rate in combination with the properties of the active fluid.

One or more embodiments of the spray nozzles described herein can be used to spray a protective coating onto a previously-applied chemical barrier coating to improve the resistance of the chemical barrier coating to attack by compounds such as calcium-magnesium alumina silicate. The chemical barrier coating also may be advantageous due to the thermal resistance of the spray coating. Optionally, other coatings could be applied with the spray systems and spray nozzles described herein.

One or more embodiments of the spray nozzles are designed to be utilized, while coupled to a movable (and remotely controlled) robotic arm, inside of a turbine engine of an aircraft. As a result of the turbine engine components having the chemical barrier coating thereon, the amount time between overhauls of the turbine engine can be extended.

The spray nozzles described herein may include an internal atomizing zone and a plenum chamber where the fluids of the multiphase mixture can mix before being ejected from the nozzle.

A control system can be used to supply a multiphase mixture of liquid droplets and a carrier gas to the spray nozzle. The two-phase mixture of liquid droplets in a carrier gas can be delivered to the nozzle system using individual tubes, coaxial tubes, or the like.

FIG. 1 illustrates an overview of a system 100 including a robotic arm 110 and a spray nozzle 120 coupled to a first end 112 (also referred to as a distal end) of the robotic arm 110. The spray nozzle 120 is configured to apply a surface treatment (e.g., an atomized multiphase spray, etc.) 131 onto an engine component 105 (which may be, for example, a turbine engine component of an aircraft).

The system 100 may include a source of liquid/slurry (e.g., a pump, etc.) 190 (illustrated in FIG. 14), which may be coupled to a second end 113 of the robotic arm 110 that is opposite to the first end 112, and which may be configured to deliver a first type of fluid (e.g., a chemical barrier coating slurry, alcohol-based solution, water, etc.) into the spray nozzle 120.

Figure 14:
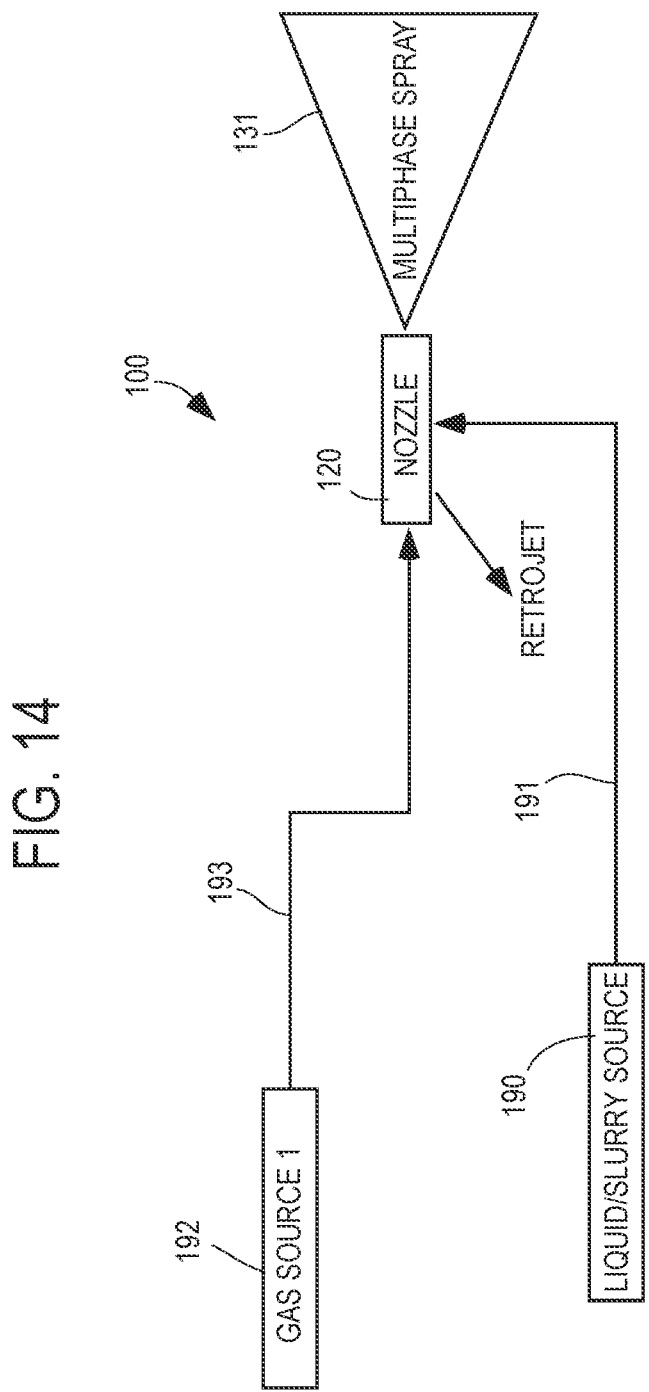
FIG. 14 is a flow chart schematic illustrating a system, where a spray nozzle device is coupled to a source of a liquid/slurry and a gas source.

As shown in FIG. 14, the system 100 may also include a first gas source 192 (which may be a gas compressor or another device (e.g., a bottle, container, etc.) suitable for providing a compressed gas to the spray nozzle 120), which may be coupled to the second end 113 of the robotic arm 110 that is opposite to the first end 112, and which may be configured to deliver a second type or a third type of fluid (e.g., a mixture of gases such as compressed air, or a single gas such as nitrogen gas, etc.) into the spray nozzle 120.

The robotic arm 110 may also be coupled to a control unit 196 (see FIG. 15) that controls the directional movement of the robotic arm 110. For example, such a control unit may be user-operated to navigate the first end 112 of the robotic arm 110 to the target surface 107 of the engine component 105. To facilitate such navigation, a camera may be coupled to the first end 112 of the robotic arm 110 and/or to the spray nozzle 120 itself.

The robotic arm 110 may include multiple interconnected segments 114 that permit the robotic arm 110 to curve relative to a longitudinal axis of the robotic arm 110 during the movement of the robotic arm 110, such that the overall shape of the robotic arm 110 may be that of an arc, as shown in FIG. 1.

In certain implementations, the robotic arm 110 has a hollow interior 115 that permits a first main line 191 coupled to the source of liquid/slurry 190 and to the spray nozzle 120 to pass therethrough. In addition, the hollow interior 115 of the robotic arm 110 permits a second main line 193 coupled to the first gas source 192 and to the spray nozzle 120 to pass therethrough. It will be appreciated that the first main line 191 and the second main line 193 do not have to pass through the hollow interior 115 of the robotic arm 110 and may be coupled to the robotic arm 110 outside of the hollow interior 115.

In some embodiments, the spray nozzle 120 is coupled to the distal or first end 112 of the robotic arm 110 such that the spray nozzle 120 is permitted to swivel in at least two directions (e.g., up and down) relative to the first end 112 of the robotic arm 110. This may be accomplished, for example, by mounting two opposing tubular coupling members 125a, 125b (see FIG. 3) of the spray nozzle 120 onto a cylindrical coupling rod 117 located at the first end 112 of the robotic arm 110.

With reference to FIG. 14, a system 100 including the robotic arm 110 and the spray nozzle 120 of FIG. 1 (or the spray nozzle 220 of FIGS. 5-7, or the spray nozzle 320 of FIGS. 8-10) may be configured such that the source of liquid/slurry 190 delivers the first type of fluid (e.g., chemical barrier coating slurry, water, alcohol-based cleaning solution, etc.) via a first main line 191 to the spray nozzle 120, while the first gas source 192 delivers a second type of fluid (e.g., air, nitrogen gas, etc.) via a second main line 193 to the spray nozzle 120. In the system 100, the force-balancing of the spray nozzle 120 is provided by the outflow (also referred to herein as retro-jets) of the second type of fluid from the balancing outlets 150 (which will be discussed in more detail below with reference to FIGS. 2-13) of the spray nozzle 120.

Figure 15:
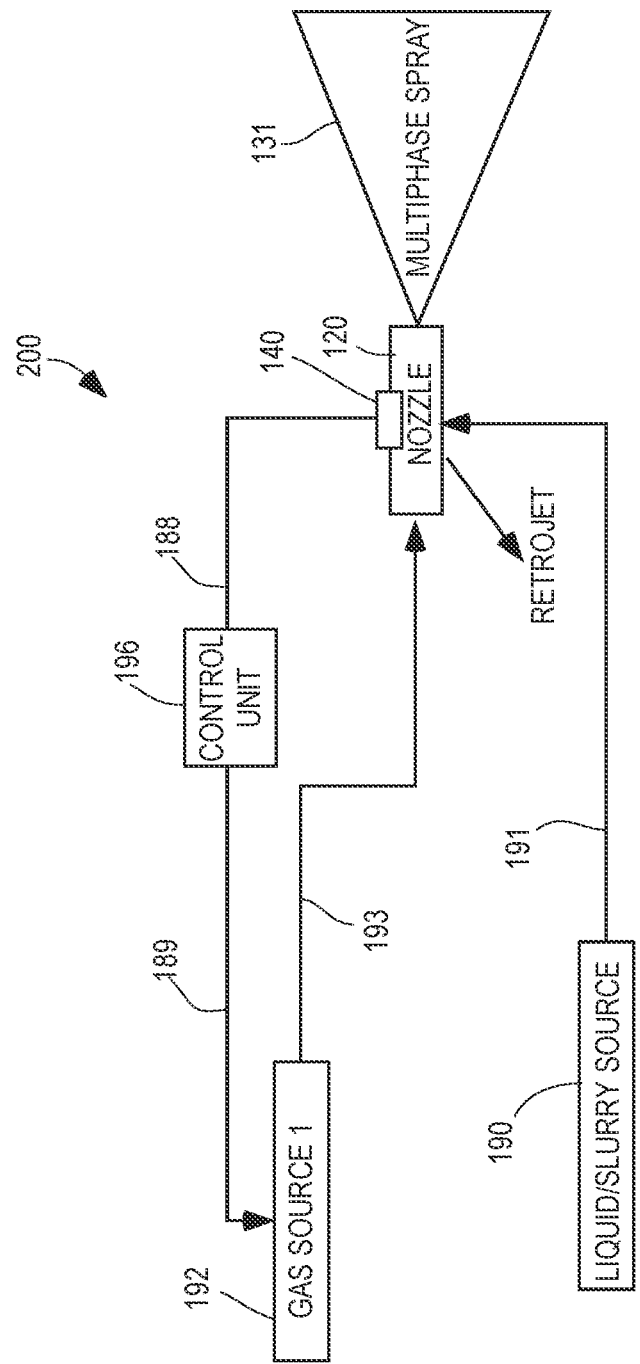
FIG. 15 is a flow chart schematic illustrating a system, where a spray nozzle device is coupled to a source of a liquid/slurry and a gas source that is controlled by a control unit.
Figure 16:
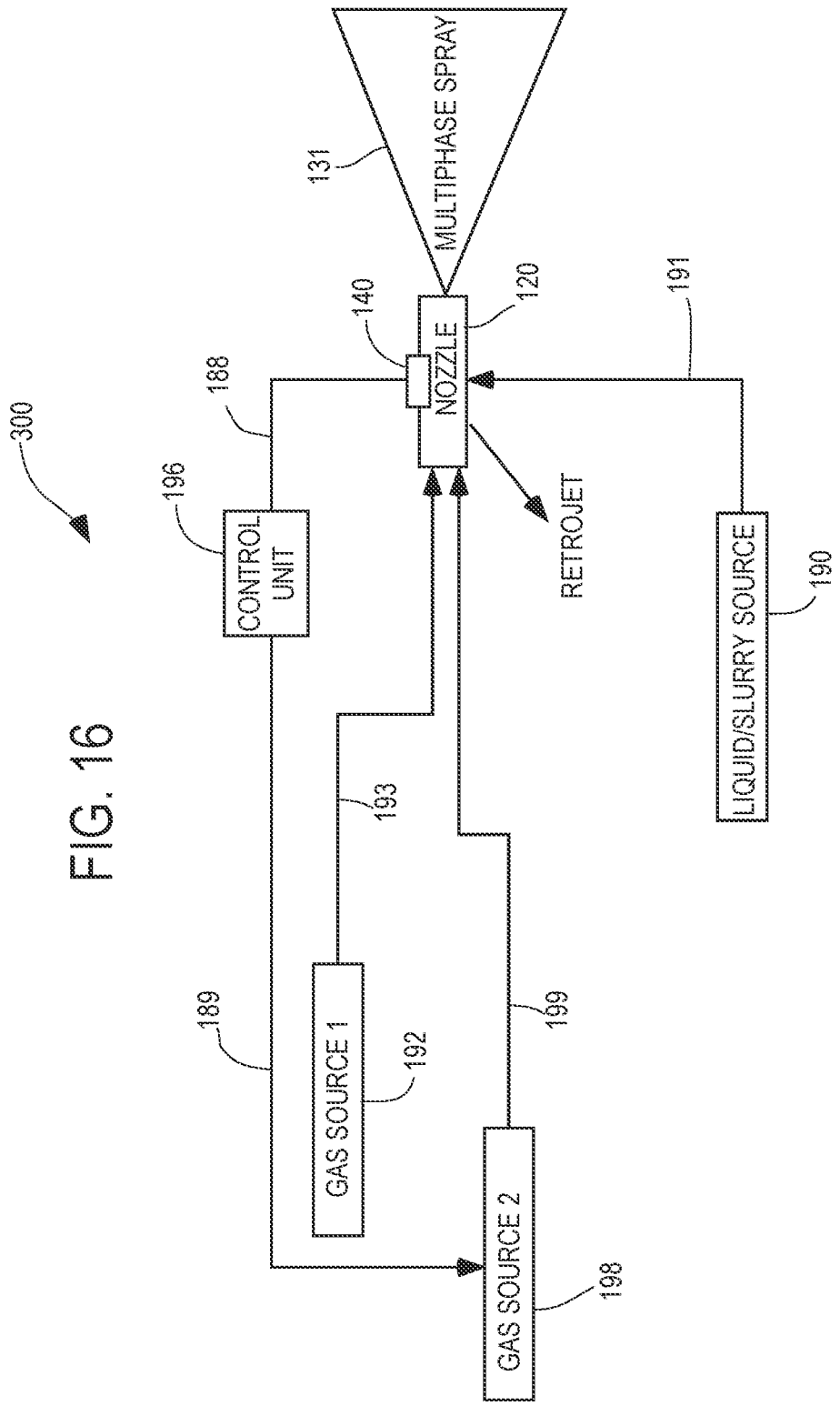
FIG. 16 is a flow chart schematic illustrating a system, where a spray nozzle device is coupled to a source of a liquid/slurry, a first gas source, and a second gas source that is controlled by a control unit.

In the exemplary alternative closed control loop systems 200 and 300 shown in FIGS. 15 and 16, the spray nozzle 120 includes at least one sensor 140. In one aspect, the sensor 140 may measure flow (e.g., speed, etc.) of a fluid (e.g., coating/cleaning solution, slurry, air, etc.) through the spray nozzle 120. In another aspect, the sensor 140 may detect a physical location or position and/or velocity and/or acceleration of the spray nozzle 120.

In the exemplary embodiment shown in FIG. 15, the system 200 includes a control unit 196 that controls the first gas source 192. In one aspect, the sensor 140 is configured to transmit a signal (via a wired or wireless connection 188) to the control unit 196, with the signal indicating, for example, the physical location of the spray nozzle 120 and/or the flow speed of one or more types of fluids (e.g., slurry, a mixture of gases such as air, a single gas such as nitrogen, etc.) within the spray nozzle 120. In some implementations, in response to receiving a signal from the sensor 140, the control unit 196 may open or close one or more metering valves 141*a*, 141*b*, 141*c* (see FIG. 4) within the spray nozzle 120 to increase or decrease an output of the first gas source 192 (which results in an increase or decrease of the speed of flow of the second type of fluid (e.g., air, etc.) through the second main line 193 and into the spray nozzle 120) to ensure a balance between the speed of the flow of the second type of fluid through the spray nozzle 120 (as well as the speed/force of ejection of the second fluid from the head 142 of the spray nozzle 120 through the second output 144) and the ejection of second type of fluid from the spray nozzle 120 through the balancing outlet(s) 150.

In one approach, if the signal transmitted by the sensor 140 to the control unit 196 indicates that the flow speed of the second type of fluid (e.g., a gas or a mixture of gases) is not sufficient to generate the desired application force of the spray 131 from the head 142 of the spray nozzle 120 onto the target surface 107 of the engine component, the control unit 196 transmits a signal that causes the metering valve 141*a* (see FIG. 4) to open more, which in turn facilitates faster flow of the second type of fluid through the nozzle 120 and causes faster/more powerful ejection of the second type of fluid from the second outlet 144 of the head 142 of the spray nozzle 120 (which also increases the speed of travel of the first type of fluid (e.g., a liquid or slurry) after it is ejected from the first outlet 130 of the head 142 of the spray nozzle 120 and mixes with the now faster-traveling second type of fluid), resulting in a higher force of application of the multiphase atomized spray 131 onto the surface 107 of the engine component 105. On the other hand, if the signal transmitted by the sensor 140 to the control unit 196 indicates that the flow speed of the second type of fluid is generating a higher-than-needed application force of the spray 131 from the head 142 of the spray nozzle 120 onto the target surface 107 of the engine component, the control unit 196 transmits a signal that causes the metering valve 141*a* (see FIG. 4) to close more, which in turn reduces the speed of flow of the second type of fluid through the spray nozzle 120 and causes slower/less powerful ejection of the second type of fluid from the second outlet 144 (which also decreases the speed of travel of the first type of fluid after it is ejected from the first outlet 130 and mixes with the now slower-traveling second type of fluid), resulting in a lesser force of application of the multiphase atomized spray 131 onto the surface 107 of the engine component 105.

In the exemplary embodiment shown in FIG. 16, the system 300 includes a first gas source 192 (which may deliver, for example, air, nitrogen gas, etc. via the second main line 193 to the spray nozzle 120) as well as a second gas source 198 (which may deliver, for example, air, nitrogen gas, etc. via a third main line 199 to the spray nozzle 120). In system 300, the control unit 196 does not control the first gas source 192, but controls the second gas source 198. The second gas source 198 may be configured to deliver to the spray nozzle 120 either the same type of fluid (e.g., a mixture of gases such as air, etc.) as the first gas source 192 or a different type of fluid (e.g., a single gas such as nitrogen gas, etc.) than the first gas source 192. In some embodiments, the first gas source 192 delivers to the spray nozzle 120 a fluid that is ejected from the spray nozzle 120 in the form of the surface treatment (e.g., an atomized multiphase spray) 131, while the second gas source 192 delivers to the spray nozzle 120 the same or a different fluid that is ejected from the balancing outlets 150 of the spray nozzle 120 to provide force-balancing to the spray nozzle 120 such that the spray nozzle 120 is restricted from deflecting/deviating from its intended spraying position.

As pointed out above, the difference between the exemplary systems 200 and 300 shown in FIGS. 15 and 16 is that the system 200 of FIG. 15 includes a first gas source 192 and a control unit 196 that controls the first gas source 192 while the system 300 of FIG. 16 includes two gas compressors 192 and 198 and the control unit 196 does not control the first gas source 192, but instead controls the second gas source 198. In some aspects, in response to receiving a signal from the sensor 140, the control unit 196 may open or close a metering valve 141*a*, 141*b*, 141*c* (see FIG. 4) within the spray nozzle 120 and/or increase or decrease an output of the second gas source 198 to ensure a force balance between the fluid flow through the spray nozzle 120 and ejection of one or more types of fluids through the balancing outlet(s) 150 from the spray nozzle 120.

FIGS. 2-4 illustrate several views (i.e., a front perspective, bottom, and cross-sectional, respectively) of the exemplary atomizing spray nozzle 120 of FIG. 1. Notably, as pointed out above, while FIG. 1 shows the spray nozzle 120 coupled to the robotic arm 110, any of the spray nozzles 220, 320, and 420 described below may be coupled to the robotic arm 110 instead of the spray nozzle 120.

The exemplary spray nozzle 120 of FIG. 1 is elongated along a central longitudinal axis thereof (see FIG. 3) and has a cylindrical shape overall, but it will be appreciated that the spray nozzle 120 may be of a different suitable shape (some exemplary shapes and configurations of the spray nozzle 120 are shown in FIGS. 5-13). The spray nozzle 120 may have a single-piece body (which may be, for example, made by injection molding, 3-D printing, etc.), or may have a body formed from several separate pieces that are joined together as spray nozzle assembly 122 which may include multiple interconnected parts (e.g., one or more components that enable the coupling of portions of the robotic arm 110 of the spray nozzle assembly 122 to portions of the spray nozzle 120 of the spray nozzle assembly 122). Notably, at least some of the parts of the spray nozzle assembly 122 may be moving parts (e.g., exemplary moving parts of the spray nozzle assembly 122 may include but are not limited to the robotic arm 110 and the portions of the spray nozzle assembly 122 and/or the robotic arm 110 that permit the spray nozzle 120 of the spray nozzle assembly 122 to swivel relative to the robotic arm 110 of the spray nozzle assembly 122).

Figure 4:
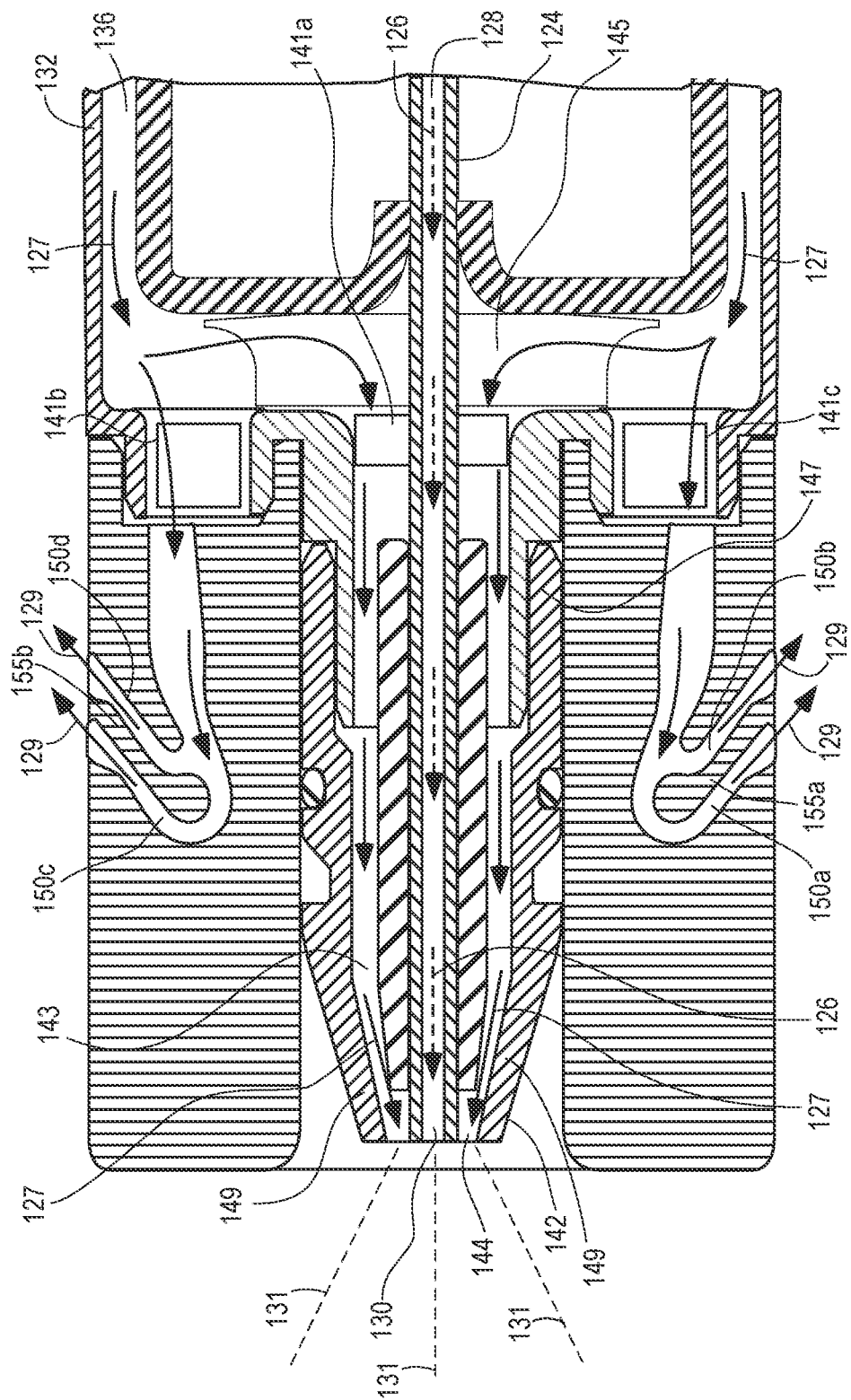
FIG. 4 is a cross-sectional view of the nozzle of FIG. 3.

The spray nozzle 120 of FIG. 4 includes a first inlet 128 and a second inlet 136 each being in fluid communication with a first outlet 130 and second outlet 144, respectively, which are located at a head 142 of the spray nozzle 120. The first inlet 128 and the second inlet 136 each receive different phases of the fluids that are atomized and mixed upon being dispensed from the head 142 of the spray nozzle 120 to form the atomized airborne multi-phase (e.g., two-phase) mixture of liquid droplets in a carrier gas. The multiphase mixture is sprayed, via the first outlet 130 and the second outlet 144, from the head 142 of the spray nozzle 120 onto a surface 107 of an aircraft engine component 105. While the exemplary spray nozzle 120 includes first and second inlets 128, 136 each being fluidly coupled to the head 142 via first and second conduits 124, 132 extending downstream of the first and second inlets 128, 136, it will be appreciated that, in some embodiments, the spray nozzle 120 may include more than first and second inlets 128, 136 and more than first and second conduits 124, 132 (see, e.g., nozzle 420 of FIGS. 11-13).

With reference to FIG. 4, the spray nozzle 120 includes a first conduit 124 that provides a first flow path (indicted by the directional arrows 126) for a first type of fluid. The first flow path 126 of the spray nozzle 120 of FIG. 4 includes the first inlet 128 and a first outlet 130. The first conduit 124 of the spray nozzle 120 extends all the way to the first outlet 130 located in the head 142 of the spray nozzle 120, such that the first type of fluid flows through the first conduit 124 of the spray nozzle 120 and is ejected from the first outlet 130 at the head 142 of the spray nozzle 120. The first type of fluid may be a free flowing liquid (e.g., water, alcohol, water-alcohol solution, etc.), a substantially stationary liquid (e.g., a slurry), or the like. In some aspects, the slurry may be suitable to form a chemical barrier coating that provides protection to the engine component 105 of FIG. 1 (or other engine components) from various contaminants.

With reference to FIGS. 4 and 14, the first inlet 128 of the first conduit 124 may be fluidly coupled to a first main fluid conduit or a first main line 191 (coupled to liquid/slurry source 190 (e.g., multiphase fluid pump)) that supplies a first type of fluid (e.g., cleaning solution, chemical coating, slurry, etc.) to the spray nozzle 120 via the first inlet 128. For example, a first or upstream end of the first main line 191 may be connected to the source of liquid/slurry 190 and a second or downstream end of the first main line 191 may be coupled to the first inlet 128 of the first conduit 124 of the spray nozzle 120.

The exemplary spray nozzle 120 of FIG. 4 additionally includes a second conduit 132 that provides a second flow path (indicated by the directional arrows 127) through the spray nozzle 120 for a second type of fluid that is different from the first fluid. The second type of fluid that may flow through the second conduit 132 of the spray nozzle 120 may be a single gas (e.g., nitrogen), or a combination of gases (e.g., air, etc.).

The illustrated second conduit 132 includes a second inlet 136 and a second outlet 144. The second conduit 132 of the spray nozzle 120 extends all the way to the first outlet 144 located in the head 142 of the spray nozzle 120, such that the second type of fluid flows through the second conduit 132 of the spray nozzle 120 and is ejected from the second outlet 144 at the head 142 of the spray nozzle 120. With reference to FIGS. 4 and 14, the second inlet 136 may be fluidically coupled to a second main fluid conduit or a second main line 193 (coupled to the first gas source 192) that supplies a second type of fluid (e.g., a gas or a mixture of gases) to the spray nozzle 120 via the second inlet 136. For example, a first or upstream end of the second main line 193 may be connected to the first gas source 192 and a second or downstream end of the second main line 193 may be coupled to the second inlet 136 of the second conduit 132 of the spray nozzle 120.

As noted above, the first main line 191 and the second main line 193 may extend through the hollow interior 115 of the robotic arm 110, or may extend on/along the exterior of the robotic arm 110 along the length of the robotic arm 110. As such, in various embodiments, the different phase fluids (e.g., gas and slurry) are kept separate from each other until these different phase fluids are combined and atomized when ejected as a surface treatment (e.g., a stream of liquid, a multiphase atomized spray, etc.) 131 via the first outlet 130 and the second outlet 144 from the head 142 of the spray nozzle 120.

In the embodiment illustrated in FIG. 4, the second conduit 132 extends around or circumferentially surrounds at least a portion of the first conduit 124, such that the first conduit 124 is an inner conduit with a first diameter, and the second conduit 132 is an outer conduit with a second diameter that is larger than the first diameter. It will be appreciated that the second conduit 132 does not have to circumferentially surround the first conduit 124, and that portions of the first and second conduits 124 and 132 may have a side-by-side or another spatial relationship relative to each other (see nozzle 320 of FIGS. 8-10 and nozzle 420 of FIGS. 11-13).

With reference to FIG. 4, the spray nozzle 120 includes a plenum chamber 145 downstream of the second inlet 136 of the second conduit 132. In the illustrated embodiment, the plenum chamber 145 receives the second type of fluid (indicated by the arrows 127) from the second conduit 132. Since the plenum chamber 145 is in fluid communication with the second outlet 144 (and the balancing outlets 150a, 150b, which will be discussed in more detail below), the second type of fluid is permitted to flow (as indicated by arrows 127) downstream from the plenum chamber 145 within the second conduit 132 until the second type of fluid exits from the second outlet 144 of the second conduit 132 and is ejected from the head 142 of the spray nozzle 120. In other words, the plenum chamber 145 of the spray nozzle 120 directs the flow of the second fluid delivered to the plenum chamber 145 by the second conduit 132 to the second outlet 144 of the second conduit 132, after which the second type of fluid flows (indicated by the arrows 127) is ejected through the second outlet 144 and from the head 142 of the spray nozzle 120 as a surface treatment 131 (e.g., a multiphase atomized spray, etc.).

In one aspect, the particles of the first type of fluid (e.g., a liquid such as a spray coating slurry, cleaning solution, etc.) flow (as indicated by the directional arrows 126) to the first outlet 130 by the first conduit 124, and the second type of fluid (e.g., a mixture of gases such as air or a gas such as nitrogen, etc.) flows to the second outlet 144 via the second conduit 132 (as indicated by the directional arrows 127), after which the first fluid and the second fluid are ejected via the first outlet 130 and second outlet 144, respectively, from the head 142 of the spray nozzle 120 to mix and form a two-phase mixture of liquid-slurry droplets in a carrier gas. In other words, upon ejection of the first fluid from the first outlet 130 and upon ejection of the second fluid from the second outlet 144, the first fluid and the second fluid mix, thereby forming a multiphase mixture of liquid droplets in a carrier gas, which represents a surface treatment 131 that is applied via the head 142 of the spray nozzle 120 onto a target surface (e.g., surface 107 of aircraft component 105 in FIG. 1).

Figure 2:
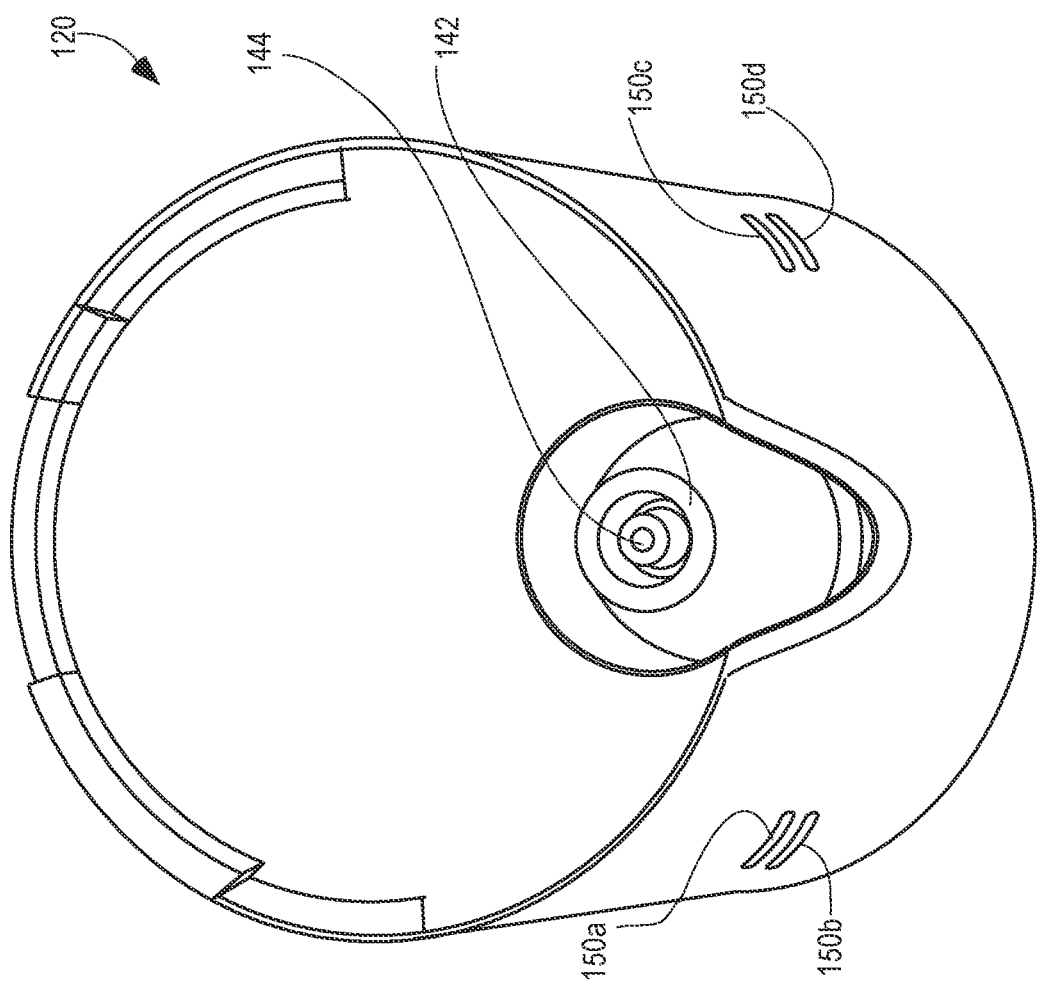
FIG. 2 is a front perspective view of the nozzle of FIG. 1.
Figure 3:
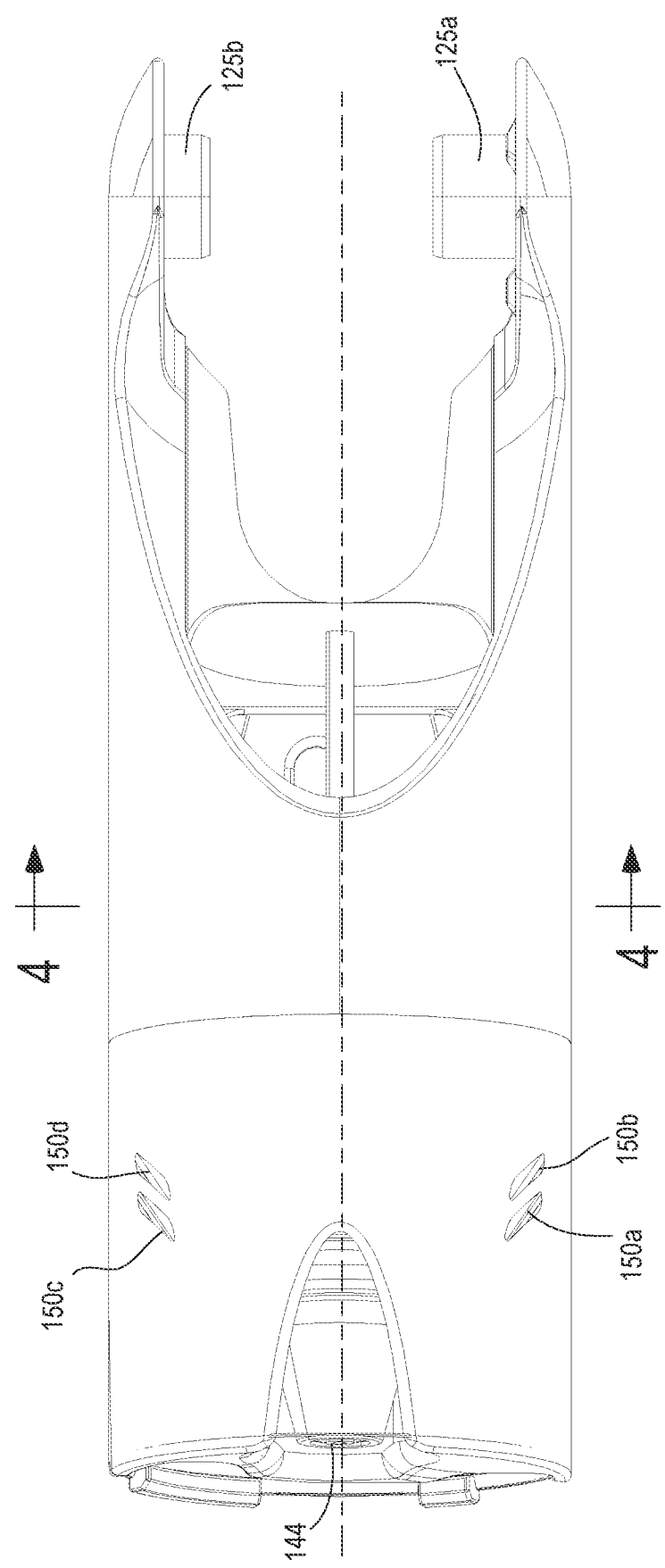
FIG. 3 is a bottom view of the nozzle of FIG. 1.

In the exemplary embodiment illustrated in FIGS. 2-4, the spray nozzle 120 includes a single head 142, but it will be appreciated that the spray nozzle 120 may include two heads (see nozzle 420 in FIGS. 11-13), or more than two heads. The head 142 of the exemplary spray nozzle 120 of FIG. 4 is formed as a tapered cylindrical channel 143 that extends downstream of the plenum chamber 145 and upstream of the first outlet 130 and the second outlet 144 in a direction along the longitudinal axis of the spray nozzle 120.

The first outlet 130 and second outlet 144 of the head 142 of the spray nozzle 120 provide openings through which the first and second fluids are ejected and then mixed to form an atomized two-phase mixture of liquid/slurry droplets in a carrier gas that represents a surface treatment 131 (e.g., a multiphase atomized spray, etc.) applied via the head 142 of the spray nozzle 120 onto one or more surfaces 107 of the target aircraft engine component 105 (e.g., as a protective coating, or as a pressurized liquid spray, etc.). In some embodiments, the spray nozzle 120 can eject the two-phase mixture of the liquid droplets in the carrier gas as a surface treatment 131 (e.g., a multiphase atomized spray, etc.) from the first outlet 130 and the second outlet of the head 142 of the spray nozzle 120 at pressures of ten to three hundred pounds per square inch.

The head 142 of the exemplary spray nozzle 120 illustrated in FIGS. 2-4 is oriented radially relative to a central longitudinal axis (see FIG. 3) of the spray nozzle 120 and extends in a direction parallel to the central longitudinal axis of the spray nozzle 120. As such, the first outlet 130 and the second outlet 144 of the head 142 of the spray nozzle 120 eject the surface treatment 131 (e.g., an atomized multiphase spray, etc.) in directions (indicated by the dashed lines 131 in FIG. 4) that are parallel to the central longitudinal axis of the spray nozzle 120 and/or extend radially away from the central longitudinal axis of the spray nozzle 120, as shown in FIG. 4. In one aspect, each of the first outlet 130 and the second outlet 144 of the head 142 of the spray nozzle 120 may have a diameter sized and shaped to atomize the multi-phase spray mixture of the slurry/liquid droplets in the carrier gas being ejected from the head 142 of the spray nozzle 120 through the first outlet 130 and through the second outlet 144.

In the embodiment illustrated in FIG. 4, the head 142 of the spray nozzle 120 has a cylindrical portion 147 and a tapered portion 149. The cylindrical portion 147 is located upstream of the tapered portion 149 and downstream of the plenum chamber 145. The tapered portion 149 is located downstream of the cylindrical portion 147 and terminates in the dispensing aperture 144. As seen in FIG. 4, the diameter of the tapered portion 149 of the dispensing outlet 142 decreases in the downstream direction (i.e., the diameter of the tapered portion 149 is largest proximally to the cylindrical portion 147 and smallest proximally to the dispensing aperture 144).

The exemplary spray nozzle 120 of FIGS. 2-4 advantageously includes structural features that balance the spray forces within the spray nozzle 120 to advantageously maintain the position accuracy of both the spray nozzle 120 and the first end 112 of the robotic arm 110 during the ejection of the surface treatment 131 (e.g., a multi-phase atomized spray, etc.) from the spray nozzle 120. In particular, in the illustrated embodiment, the spray nozzle 120 includes multiple balancing outlets 150a-150d (also referred to as force-balancing "retro-jets") to achieve this advantageous force balance, thereby avoiding a significant deflection or deviation of the first end 112 of the robotic arm 110 and of the spray nozzle 120 from their intended positions during the spraying of the surface 107 of the engine component 105.

Figure 17:
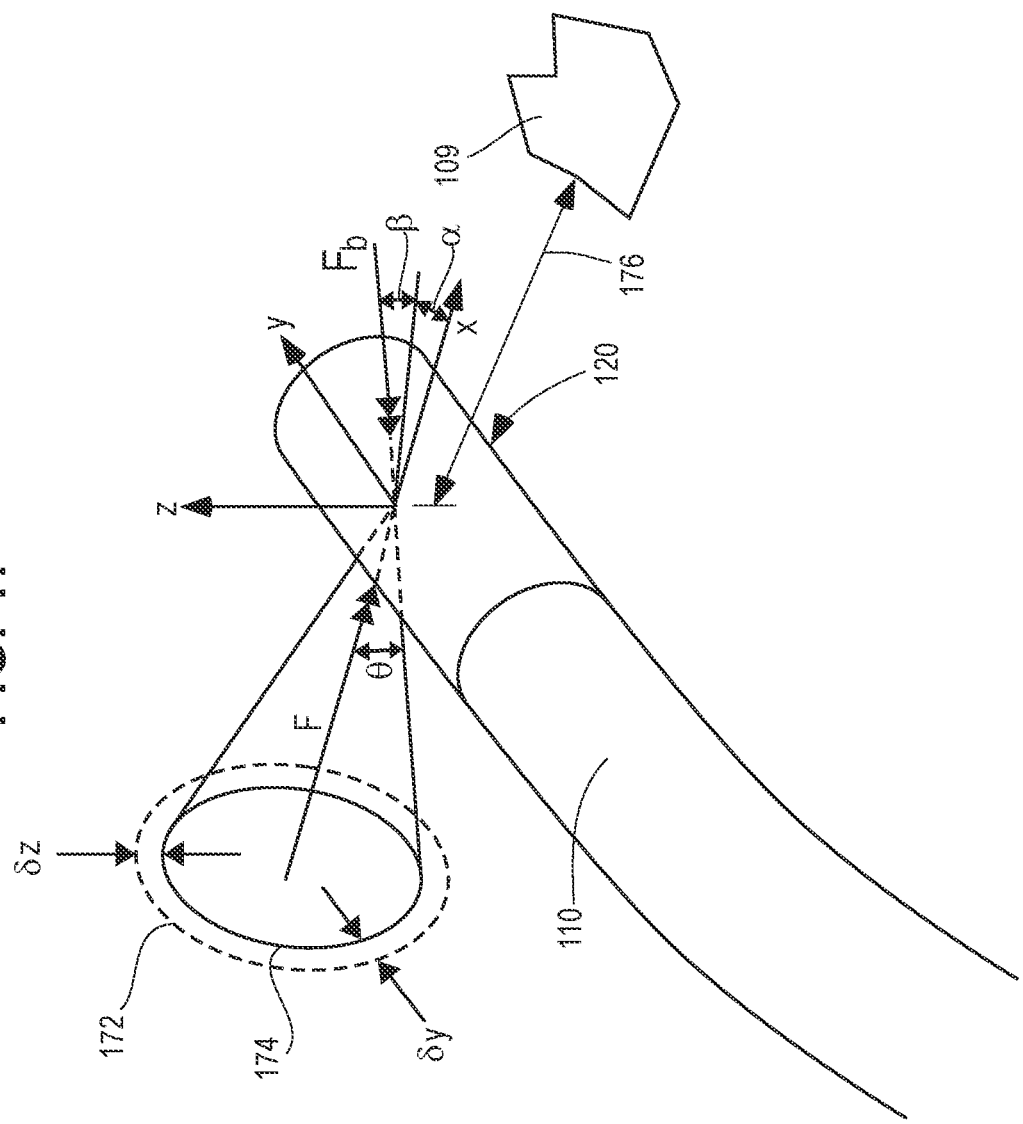
FIG. 17 is a schematic illustration of an exemplary spray application via a spray nozzle assembly including a spray nozzle and a robotic arm and at least one balancing outlet, and showing the possible applicable spray force directions and spray nozzle assembly movements.

In some instances, the bounds to maintain the position to achieve a desired accuracy may be a function of the environment and the support structure or properties of the robotic arm 110. In one example, the robotic arm 110, which may be a snake-arm robot, may be positioned within a cluttered environment with which it is undesirable for the robotic arm 110 to come into contact. The position accuracy of the robotic arm 110 may in this instance be defined by reference to an initial clearance 176 between the robotic arm 110 and an object 109 within the cluttered environment, as shown in FIG. 17, a stiffness of the robotic arm 110, and a reaction force from a spray nozzle 120. Resolved into the direction of the initial clearance 176 between the robotic arm 110 and the object 109 within the cluttered environment, in the direction of the nearest point between the object 109 and the robotic arm 110, the force divided by the stiffness is less than the initial clearance 176, $F/k<c$, where F is the reaction force, k is the stiffness and c is the initial clearance 176, all measured in the same direction.

If the stiffness or clearance are too low or the reaction force is too high to satisfy this equation in the unbalanced condition, it is useful to generally balance some proportion of the reaction force using at least one balancing jet (emitted from the at least one balancing outlet 150a-150d). In this case, the equation may be modified so that $(F-F_b)/k<c$, where $F_b$ is the balancing force. It may not always be convenient or practical to arrange the at least one balancing jet so that the balancing force and reaction force are precisely equal in magnitude, i.e. that $F=F_b$. In such instances, it may still be advantageous to balance some proportion of the reaction force with an unequal balancing force.

For example, in an instance where a balancing jet gas exiting through the balancing outlets 150 is the same as a spray gas being ejected through the second outlet 144, and it is convenient to supply both outlets with gas from a connected supply and/or line, it may be desirable to select $F_b$ so that $F_b=F/n$, where n is a number typically greater than 1. In other instances, n may be less than 1, for example where an over-compensation may be useful. For example, n may be controlled by the metering valves 141*b*, 141*c* where opening one or both of the metering valves 141*b*, 141*c* may decrease n and closing one or both of the metering valves 141*b*, 141*c* may increase n.

It may be advantageous to configure the system so that n is greater than 1 in instances where the supply of gas is limited and the application is tolerant of some movement, where some movement is less than an uncompensated movement but greater than no movement. In either of these cases, the balancing force $F_b$ may advantageously be +/−1%, 2%, 5%, 10%, 20%, 50%, 100% of the reaction force F. In some embodiments, different stiffnesses of the robotic arm 110 (or support structure) of the spray nozzle assembly 122, or different constraint amounts, may allow for different proportions or amounts of imbalance between components of F and $F_b$ resolved in different directions for example in the orthogonal directions x, y and z (see FIG. 17).

This may advantageously allow some magnitude of imbalance and/or selective misalignment of the lines of action of the reaction force and the balancing force, for example, to enable a balancing nozzle to be conveniently positioned in the spray nozzle 120 or in the robotic arm 110 of the spray nozzle assembly 122 offset from the line of action of the reaction force. In some embodiments, the precision to maintain the position accuracy may be a function of the process effect, for example in the exemplary spray application shown schematically in FIG. 17.

In this example, the cone of a process spray with a half angle of θ meets the target surface 107 nominally at a circle 174 shown in perspective in FIG. 17 (the circle 174 schematically represents the "spray bounds"). An allowable limit of spray coverage is shown in this example as another circle 172 (which represents the "spray limits"). In the nominal or resting position in this example, before spraying, there is an equal distance between the spray bounds 174 and the spray limits 172, shown in two orthogonal axes as δy and δz. When spraying causes a reaction force from the spray process, F, the force will tend to move the spray nozzle assembly 122 to the right, i.e. in the x direction.

An effect of this movement will be to increase the radial dimension of the spray bounds 174, by a value of $\{(F-F_b \cos \alpha \cos \beta)/k_x\}$ tan 0, where a is the angle between a misaligned balancing jet and the x axis in the x-y plane, β is the from the balancing jet to the x-y plane, and $k_x$ is the stiffness of the robotic arm 110 in the x axis. Because the at least one balancing jet is misaligned with the direction of the reaction force, in this case the x axis, components of the balancing force also act in the other two axes, y and z. Displacement in they axis will be equal to $F_b \sin \alpha \cos \beta/k_y$ where $k_y$ is the stiffness of the arm in they axis. Similarly, displacement in the z axis will be equal to $F_b \sin \beta/k_z$ where $k_z$ is the stiffness of the arm in the z axis.

In order to avoid spraying outside the spray limits 172 in this example of FIG. 17, the balancing jet including the balancing force and balancing jet angles α and β are designed to ensure that the combination of displacements does not cause the spray bounds 174 to exceed the spray limits 172, by appropriately selecting from suitable values for the balancing jet force and balancing jet angles taking account of the different stiffness and limits applying in the different axis directions and in combination.

The stiffness of a slender snake-like robotic arm 110 may be an order of magnitude different or more, in one direction compared to another direction. For example in the case of a snake-like robotic arm 110 following an arcuate curve (examples of such curves of the robotic arm 110 are shown in FIGS. 1 and 17), the stiffness of the robotic arm 110 in the plane of curvature is typically much larger than the stiffness out of the plane of curvature. Thus the balancing jet axis may be appropriately and advantageously selected at an angle of more than 0, 1, 2, 5, 10, 20, 50 degrees and of up to 1, 2, 5, 10, 20, 50, 75 degrees to the axis of the spray nozzle assembly 122 while still satisfying the constraints of the application subject to the properties of the support structure or robotic arm 110. The preceding calculation examples apply in the case of static loading conditions, or quasi-static conditions such as obtained with a well-damped structure and progressively applied loading.

It will be apparent to a person skilled in the art that appropriate modifications to the calculations may be implemented to take account of the dynamic response of the robotic arm 110, the spray nozzle 120, or other support structure of the spray nozzle assembly 122, whether caused by a relatively sudden change in a spray reaction loading or due to a periodic disturbance brought about, for example, by periodic flow changes in a spray nozzle such as may be caused by a source of fluid or slurry (e.g., a pump). In some instances, it may be advantageous to modify the dynamic response of the support structure or robotic arm 110 of the spray nozzle assembly 122. For example, if the perturbation is periodic at a similar frequency to the natural frequency of response of the structure or robotic arm 110, the response may be modified by adding one or more tuned mass dampers to the robotic arm 110 or to the spray nozzle assembly 122.

Alternatively and advantageously, it may be possible to add sensors either to the system element causing the perturbation or to the robotic arm 110 or support structure or the nozzle of the spray nozzle assembly 122 to measure the cause or effect of the periodic disturbance, and to control the balancing force to compensate for it (e.g., via control of the metering valves 141*a*, 141*b*, 141*c*). It will be appreciated that in each case where a direction or axis of a spray nozzle or jet or reaction nozzle or jet has been referred to above, the same arguments apply equally well to a fixed or variable combination of nozzles or jets acting in a group, whether or not their individual directions or axes are parallel to each other.

The exemplary spray nozzle 120 shown in FIGS. 2-4 includes a first pair of balancing outlets 150*a*, 150*b* on one side of the head 142 and a second pair of balancing outlets 150*c*, 150*d* on an opposite side of the head 142. The balancing outlets 150*a*-150*d* of the spray nozzle 120 are oriented in a generally opposite direction relative to the direction of the first outlet 130 and second outlet 144 of the head 142 (and the direction of ejection of the spray 131 from the spray nozzle 120). In other words, while the first outlet 130 and second outlet 144 of the spray nozzle 120 are oriented such that they eject the surface treatment (e.g., an atomized multiphase spray, etc.) 131 in a generally forward or downstream direction relative to the head 142 as shown in FIG. 4, the balancing outlets 150*a*-150*d* are oriented such that they eject the balancing jets 129 of fluid (e.g., air) in a generally rearward or upstream direction relative to the head 142, as shown in FIG. 4.

It will be appreciated that one or more balancing outlets 150*a*-150*d* may be used in each location where a pair of balancing outlets 150*a*-150*d* has been shown. For example, the balancing outlets 150*a* and 150*b* may be replaced with a single balancing outlet. Similarly, the balancing outlets 150*c* and 150*d* may be replaced with a single balancing outlet. The number of balancing outlets 150*a*-150*d* used in various embodiments of the spray nozzle 120 may be chosen to optimally form the balancing jet flow from the spray nozzle 120, or to provide better control of the flow rate by controlling the fluid supply pressure, or to avoid presenting a single large opening so as to avoid foreign object ingress, or for other structural or functional reasons.

In the illustrated embodiment, the balancing outlets 150*a*-150*d* are in fluid communication with the second conduit 132 such that the second type of fluid (e.g., a mixture of gases such as air or a single gas such as nitrogen, etc.) emitted from the balancing outlets 150*a*-150*d* of the spray nozzle 120 is the same type of fluid that is fed into the second inlet 136 of the second conduit 132 from the first gas source 192 via the first main line 193. Notably, the balancing outlets 150*a*-150*d* of the exemplary spray nozzle 120 of FIG. 4 are not in fluid communication with the first conduit 124 of the spray nozzle 120 such that the first type of fluid (e.g., coating slurry, cleaning solution, etc.) is restricted from being emitted from the balancing outlets 150a-150d of the spray nozzle 120.

In some embodiments, the balancing outlets 150a-150d of the spray nozzle 120 are sized, shaped, and oriented at certain angles relative to the central longitudinal axis (see FIG. 3) of the spray nozzle 120 to provide optimal balancing of the forces of the fluids passing through the spray nozzle 120 and being sprayed from the spray nozzle 120.

In the embodiment illustrated in FIG. 4, the balancing outlets 150a, 150b are separated from each other by a partition wall 155a that is angled relative to the central longitudinal axis of the spray nozzle 120 (which, in the example shown in FIG. 4, would be colinear with the dashed lines representing the flow 126 and the horizontal dashed line 131 representing the spray 131) to provide the desired flow of the retro-jets 129 through the balancing outlets 150a, 150b and the desired force balancing of the first and second fluids passing through the first output 130 and second output 144, respectively, and being ejected from the head 142 of the spray nozzle 120. Similarly, the balancing outlets 150c, 150d are separated from each other by a partition wall 155b that is angled relative to the central longitudinal axis of the spray nozzle 120 to provide the desired flow of the retro-jets 129 through the balancing outlets 150a, 150d and the desired force balancing of the first and second fluids passing through the first output 130 and second output 144, respectively, and being ejected from the head 142 of the spray nozzle 120.

As mentioned above, FIG. 14 illustrates a diagram of an exemplary spraying system 100 that relies solely on the balancing outlets 150a-150d to balance the forces of the fluids passing through and being sprayed from the spray nozzle 120. On the other hand, FIGS. 15 and 16 illustrate diagrams of exemplary systems 200, 300 that, in addition to the balancing outlets 150a-150d, also rely on a closed-loop control mechanism that includes one or more sensors 140 (position sensor, velocity sensor, acceleration sensor, etc.) installed within the spray nozzle 120 and configured to transmit signals to a control unit 196, which in turn controls the flow of the second type of fluid (e.g., air) through the second conduit 132, through the plenum chamber 145, and through the balancing outlets 150a-150d, for example, by way of increasing the output of the first gas source 192 that feeds the second fluid into the spray nozzle 120 via the second main line 193, or by way of opening/closing a metering valve 141a, 141b, 141c installed within the spray nozzle 120, thereby controlling the speed of ejection of the second fluid from the second output 142 of the head 142 and the speed of ejection of the second fluid from the balancing outlets 150a-150d.

In particular, as discussed above, FIGS. 15 and 16 show embodiments of spraying control systems 200 and 300 that can be used to control operation of the spray nozzle 120 (to, for example, spray a restorative/protective coating onto a surface 107 of the engine component 105, which may be, for example, a turbojet aircraft engine component). In the illustrated embodiments, the systems 200 and 300 each include a control unit 196 comprising hardware circuitry that includes and/or is connected with one or more processors (e.g., one or more microprocessors, field programmable gate arrays, and/or integrated circuits).

The control unit 196 may be connected to the first gas source 192 of the system 200 as in FIG. 15 or to the second gas source 198 of the system 300 as in FIG. 16 via a wired or wireless connection 189 to change (i.e., increase or decrease) the speed at which the first and second gas compressors 192 and 198 respectively feed the second fluid (e.g., air, nitrogen gas, etc.) into the second main fluid line 193 in FIG. 15 and into the third main fluid line 199 in FIG. 16. As pointed out above, the control unit 196 may thus control delivery of the multiphase materials (e.g., liquid, slurry, or the like particles/droplets and/or one or more gases) to the spray nozzle 120 or spray nozzle 420 via the robotic arm 110. For example, the control unit 196 may control the flow rate, pressure, and/or duration at which a liquid or liquid-like substance (e.g., water, chemical barrier coating slurry, alcohol, or the like) and/or gas (e.g., air, nitrogen gas, or the like) are fed into the spray nozzle 120 or spray nozzle 420 via the source of liquid/slurry 190 and/or the first gas source 192 (FIG. 15) and/or the second gas source 198 (FIG. 16) from one or more sources such as storage tanks or other containers.

The control unit 196 of the systems 200 and 300 may be configured to receive signals (via wired or wireless connections 188) from one or more sensors 140 (e.g., position sensors, flow sensors, etc.) installed within the spray nozzle 120. The control unit 196 may be also be configured to generate wired or wireless signals to one or more metering valves 141a, 141b, 141c within the spray nozzle 120, to one or more sources of liquid (e.g., pumps) 190, and/or one or more gas sources (e.g., gas compressors 192, 198) to control delivery of one or more types of fluids to the spray nozzle 120.

With reference to FIGS. 4 and 15, in one aspect, the fluid flow in the second main line 193 and the second conduit 132 may be controlled by an electronic proportioning valve 141a, 141b, 141c and measured using the flow sensor 140. In some embodiments, the flow sensor 140 can include circuitry and a transmitter configured to transmit, to the control unit 196, the flow rates (e.g., of water and/or slurry and/or gas) measured in the second conduit 132 and/or the second main line 193. In certain aspects, the control unit 196 is programmed to interpret the flow rate information received from the flow sensor 140 to determine a desired operating speed of the first gas source 192 (system 200 of FIG. 15) or the second gas source 198 (system 300 of FIG. 16) for introducing a certain fluid into the second main line 193 and/or the third main line 199.

Figure 5:
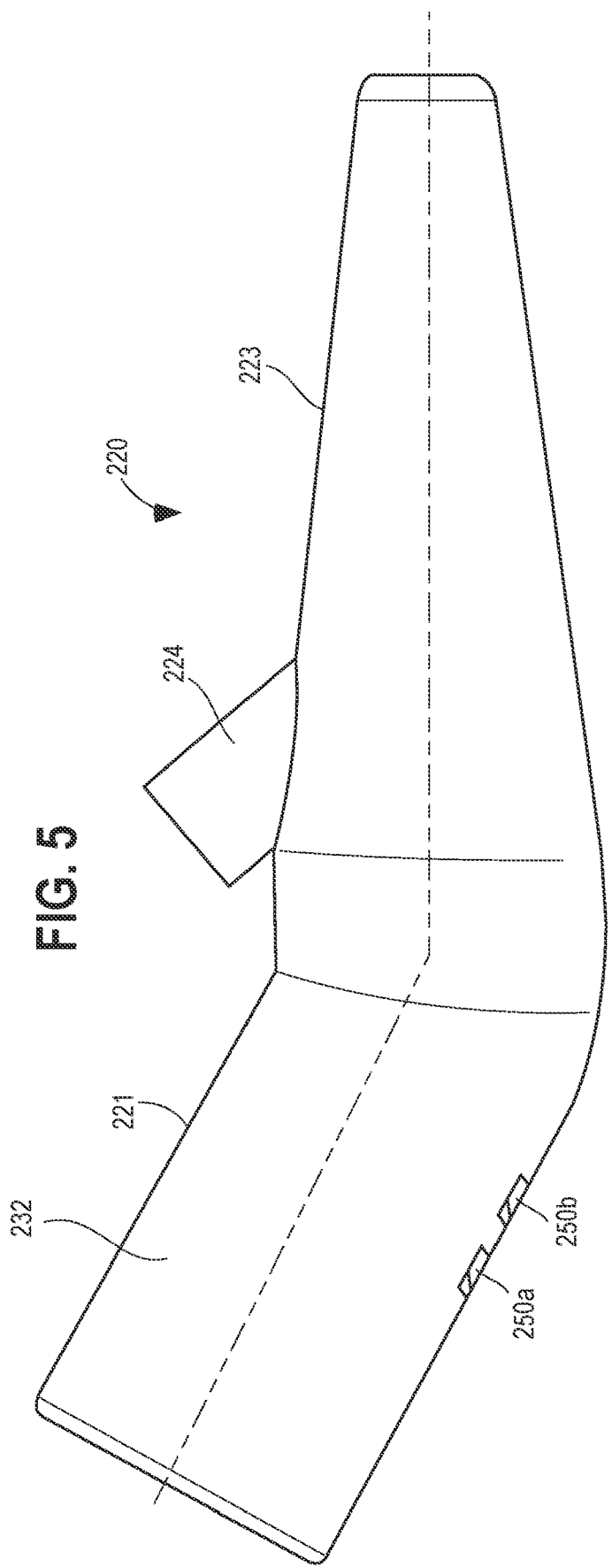
FIG. 5 is a side view of a spray nozzle according to another embodiment.
Figure 6:
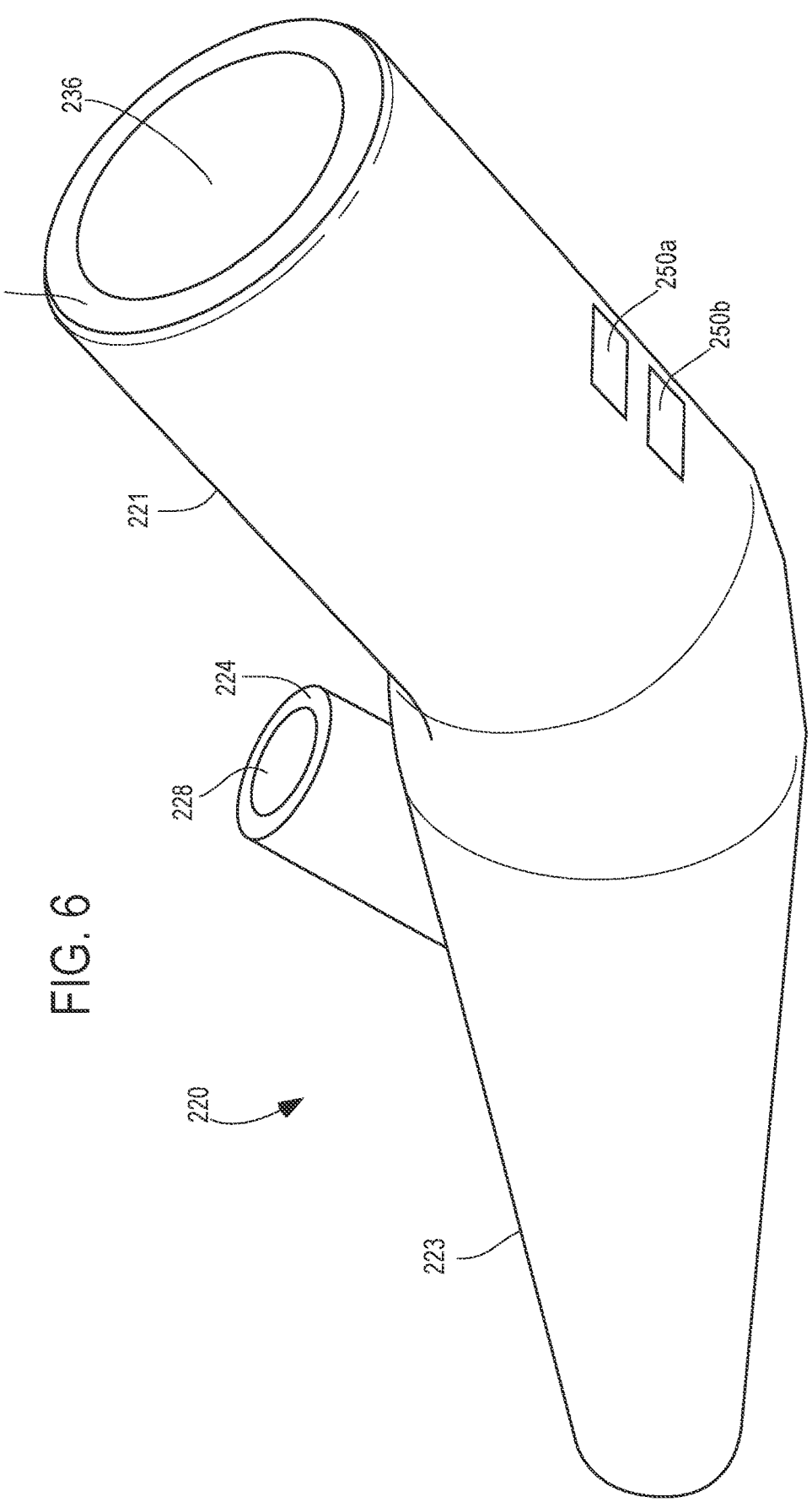
FIG. 6 is a perspective side-rear view of the nozzle of FIG. 5.
Figure 7:
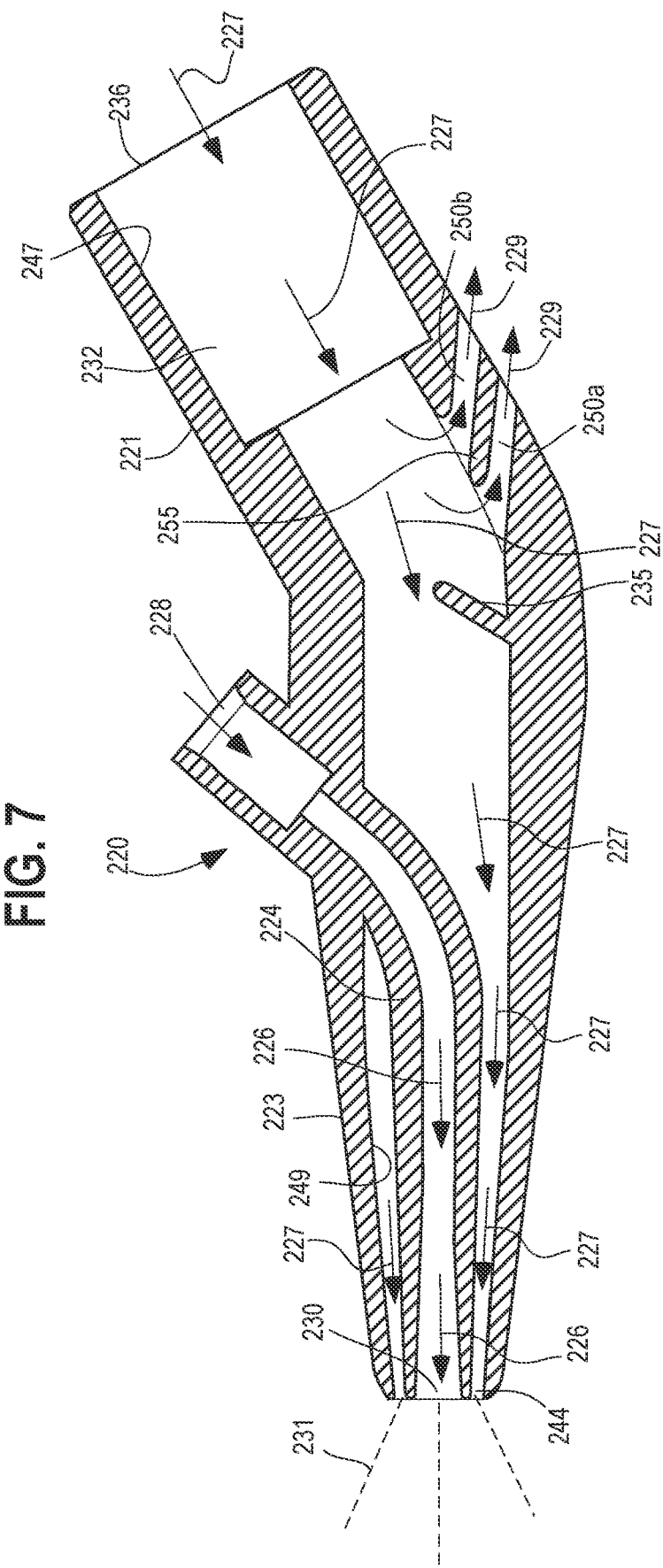
FIG. 7 is a cross-sectional view of the nozzle of FIG. 5.

FIGS. 5-7 illustrate several views (i.e., a front perspective, bottom, and cross-sectional, respectively) of an atomizing spray nozzle 220 according to a different embodiment. The spray nozzle 220 has an overall construction that has similarities to the construction of the above-discussed atomizing spray nozzle 120, with some differences highlighted below. For ease of reference, aspects of the spray nozzle 220 that are similar to aspects of the spray nozzle 120 described above with reference to FIGS. 2-4 have been designated in FIGS. 5-7 with similar reference numbers, but prefaced with a "2" instead of "1."

One difference between the overall shape of the spray nozzle 220 in comparison to the overall shape of the spray nozzle 120 is that the spray nozzle 120 has a cylindrical shape overall, but the spray nozzle 220 has an upstream cylindrical portion 221 and a downstream tapered portion 223. Another difference is that the central longitudinal axis of the spray nozzle 120 is a single straight line as shown in FIG. 3 (due to the overall cylindrical shape of the spray nozzle 120). The overall shape of the spray nozzle 220 is such that the central longitudinal axis of the spray nozzle 220 is in the shape of two intersecting lines that form an obtuse interior angle therebetween. In other words, the portion of the central longitudinal axis passing through the upstream cylindrical portion 221 of the spray nozzle 220 is angled at an angle of greater than 90 degrees relative to the portion of the central longitudinal axis passing through the downstream tapered portion 223 of the spray nozzle 220. Similar to the spray nozzle 120, however, the spray nozzle 220 may have a single-piece body (which may be, for example, made by injection molding, 3-D printing, etc.), or may have a body formed from several separate pieces that are joined together.

Similar to the spray nozzle 120, the spray nozzle 220 includes a first inlet 228 and a second inlet 236, as well as a first conduit 224 and a second conduit 232. However, the location of the first inlet 128 of the spray nozzle 120 is different from the location of the first inlet 228 of the spray nozzle 220. In particular, as can be seen in FIG. 4, the first inlet 128 of the spray nozzle 120 is located within an interior of the spray nozzle 120, and no portion of the first inlet 128 extends outwardly from an exterior surface of the body of the spray nozzle 120. Conversely, the first inlet 228 of the spray nozzle 220 extends outwardly relative to an exterior surface of the body of the spray nozzle 220 as shown in FIG. 7. In particular, the first inlet 228 fluidly/physically couples to (and/or forms an integral part of) the downstream tapered portion 223 of the spray nozzle 220, and does not physically couple to the upstream cylindrical portion 221 of the spray nozzle 220.

A similarity of the spray nozzle 220 of FIG. 7 to the spray nozzle 120 of FIG. 4 is that a portion of the second conduit 232 extends around or circumferentially surrounds a portion of the first conduit 224, such that, along a portion of the length of the spray nozzle 220, the first conduit 224 is an inner conduit with a first diameter, and the second conduit 232 is an outer conduit with a second diameter that is larger than the first diameter. As pointed out above, the second conduit 232 does not have to circumferentially surround the first conduit 224, and the first and second conduits 224 and 232 may have a side-by-side or another spatial relationship (see nozzle 320 of FIGS. 8-10 and nozzle 420 of FIGS. 11-13).

As discussed above, the spray nozzle 120 of FIGS. 2-4 includes a head 142 that is formed as a tapered cylindrical channel 143 that extends from the plenum chamber 145 toward the first outlet 130 and second outlet 144 in a direction along the central longitudinal axis of the spray nozzle 120. Another difference between the spray nozzle 120 and the spray nozzle 220 is that, while the spray nozzle 220 of FIGS. 5-7 does include a second outlet 244 akin to the second outlet 144 of the spray nozzle 120, the spray nozzle 220 does not include a head akin to the head 142 of FIGS. 2-4.

In addition, while the second conduit 132 of the spray nozzle 120 is generally cylindrical, the second conduit 232 of the spray nozzle 220 includes a cylindrical portion 247 and a tapered portion 249. The cylindrical portion 247 is located upstream of the tapered portion 249. The tapered portion 249 is located downstream of the cylindrical portion 247 and upstream of the dispensing aperture 244, and the diameter of the tapered portion 249 decreases in the downstream direction (i.e., the diameter of the tapered portion 249 is largest proximally to the cylindrical portion 247 and smallest proximally to the dispensing aperture 244). Unlike the spray nozzle 120, the spray nozzle 220 does not have a plenum chamber akin to the plenum chamber 145 of the spray nozzle 120.

As pointed out above, the first conduit 124 of the spray nozzle 120 extends all the way to the first outlet 130 of the head 142 of the spray nozzle 120, such that the first type of fluid (e.g., a liquid, a slurry, etc.) flows (see arrows 126) through the first conduit 124 of the spray nozzle 120 and is ejected as a surface treatment 131 from the first outlet 130 of the head 142 of the spray nozzle 120, together with the second type of fluid (e.g., one or more gases) passing through the second conduit 132 and being ejected from the second outlet 144 of the head 142 of the spray nozzle 120. Similarly, the first conduit 224 of the spray nozzle 220 extends all the way to the first outlet 230 of the spray nozzle 220, such that the first type of fluid (e.g., a liquid, a slurry, etc.) flows (as indicated by arrows 226) through the first conduit 224 of the spray nozzle 220 as indicated by the arrows 226 and is ejected as an atomized multiphase spray 231 from the first outlet 230, together with the second type of fluid (e.g., one or more gases) passing through the second conduit 232 and being ejected through the second outlet 244 of the spray nozzle 220.

Like the first outlet 130 and second outlet 144 of the spray nozzle 120, the first outlet 230 and second outlet 244 of the spray nozzle 220 provide openings through which the first and second types of fluids are ejected from the spray nozzle 220 such that they mix together to form the atomized two-phase mixture of liquid/slurry droplets in a carrier gas, which is applied onto one or more surfaces 107 of the target engine (e.g., aircraft engine) component 105 (e.g., as a protective coating, or as a pressurized liquid spray, etc.). Like the spray nozzle 120, the spray nozzle 220 can apply the two-phase mixture of liquid droplets in a carrier gas as a spray 231 onto a target surface 107 of a target aircraft component 105 at pressures of ten to three hundred pounds per square inch.

Also, similarly to the first outlet 130 and the second outlet 144 of the spray nozzle 120, the first outlet 230 and the second outlet 244 of the spray nozzle 220 are configured to eject the first and second types of fluid such that they mix and form the multiphase mixture spray 231 that is propelled in directions (indicated by the dashed lines 231 in FIG. 7) that are parallel to the central longitudinal axis and/or extend radially away from the central longitudinal axis of the spray nozzle 220. Also, similarly to the first outlet 130 and the second outlet 144 of the spray nozzle 120, the first outlet 130 and the second outlet 244 of the spray nozzle 220 may have a diameter that is sufficiently small to enable the first outlet 230 and the second outlet 244 of the spray nozzle 220 to eject the first and second types of fluid through the first outlet 230 and second outlet 244, respectively, as an atomized multi-phase spray mixture of the slurry/liquid droplets in the carrier gas.

Like the spray nozzle 120, the spray nozzle 220 includes structural features that balance the spray forces to advantageously restrict undesired deflection/deviation and maintain position accuracy of the spray nozzle 220 and the distal end 111 of the robotic arm 110 during the spraying of the multiphase spray 231 from the spray nozzle 220. However, while the spray nozzle 120 includes two pairs of balancing outlets, i.e., 150*a*, 150*b* and 150*c*, 150*d*, the spray nozzle 220 includes one pair of balancing outlets 250*a*, 250*b* (also referred to as "retro-jets"), which help the spray nozzle 220 achieve this advantageous force balance, thereby advantageously avoiding a significant deflection or deviation of the distal end 111 of the robotic arm 110 and therefore the spray nozzle 220 from their intended spraying positions.

In particular, the spray nozzle 220 includes the first balancing outlet 250*a* and the second balancing outlet 250*b*. Like the balancing outlets 150*a*-150*d* of the spray nozzle 120, the balancing outlets 250*a*-250*b* of the spray nozzle 220 are oriented in a generally opposite direction relative to the direction of the first outlet 230 and second outlet 244. In other words, while the first outlet 230 and second outlet 244 are oriented such that they emits the atomized multiphase spray 231 in a generally forward or downstream direction relative to the first outlet 230 and second outlet 244, the balancing outlets 250a-250b are oriented such that they emit the balancing jets 229 of fluid (e.g., air) in a rearward or upstream direction relative to the first outlet 230 and second outlet 244 (as shown by the directional arrows 229 in FIG. 7).

Similarly to the balancing outlets 150a-150d of the spray nozzle 120, the balancing outlets 250a-250b of the spray nozzle 220 are in fluid communication with the second conduit 232 such that the second type of fluid (e.g., a mixture of gases such as air or a single gas such as nitrogen, etc.) emitted from the balancing outlets 250a-250b of the spray nozzle 220 is the same type of fluid that is fed into the second inlet 236 of the second conduit 232 from the first gas source 192 via the first main line 193. Also, similarly to the balancing outlets 150a-150d of the spray nozzle 120, the balancing outlets 250a-250b of the spray nozzle 220 are not in fluid communication with the first conduit 224 such that the first type of fluid (e.g., coating slurry, cleaning solution, etc.) is restricted from being emitted from the balancing outlets 150a-150b of the spray nozzle 220.

Like the balancing outlets 150a-150d of the spray nozzle 120, the balancing outlets 250a-250b of the spray nozzle 220 are sized, shaped, and oriented at certain angles relative to the central longitudinal axis of the spray nozzle 220 to provide optimal balancing of the forces of the fluids passing through the spray nozzle 220 and being sprayed from the dispensing aperture 244 of the spray nozzle 220. In the embodiment shown in FIG. 7, the balancing outlets 250a, 250b are separated from each other by a partition wall 255 that is angled relative to the central longitudinal axis of the spay nozzle 220 to provide the desired flow of the retro-jets 229 through the balancing outlets 250a, 250b and the desired force balancing of the fluids passing through and being ejected from the spray nozzle 220. It will be appreciated that the angle of the partition wall 255 shown in FIG. 7 is shown by way of example only, and that the partition wall 255 may be angled differently in other embodiments. Furthermore, while the spray nozzle 220 is shown with only two balancing outlets 250a, 250b, it will be appreciated that, in some embodiments, the spray nozzle 220 may have more than two balancing outlets (e.g., 4 (or more) balancing outlets). In the embodiment illustrated in FIG. 7, the spray nozzle 220 includes a wall 235 extending inwardly into the second conduit 232. The wall 235 is sized and angled (the size and inclination of the wall 235 in FIG. 7 are exemplary) to divert some of the second fluid flow (indicated by directional arrows 227) in second conduit 232 toward the balancing outlets 250a-250b.

Figure 8:
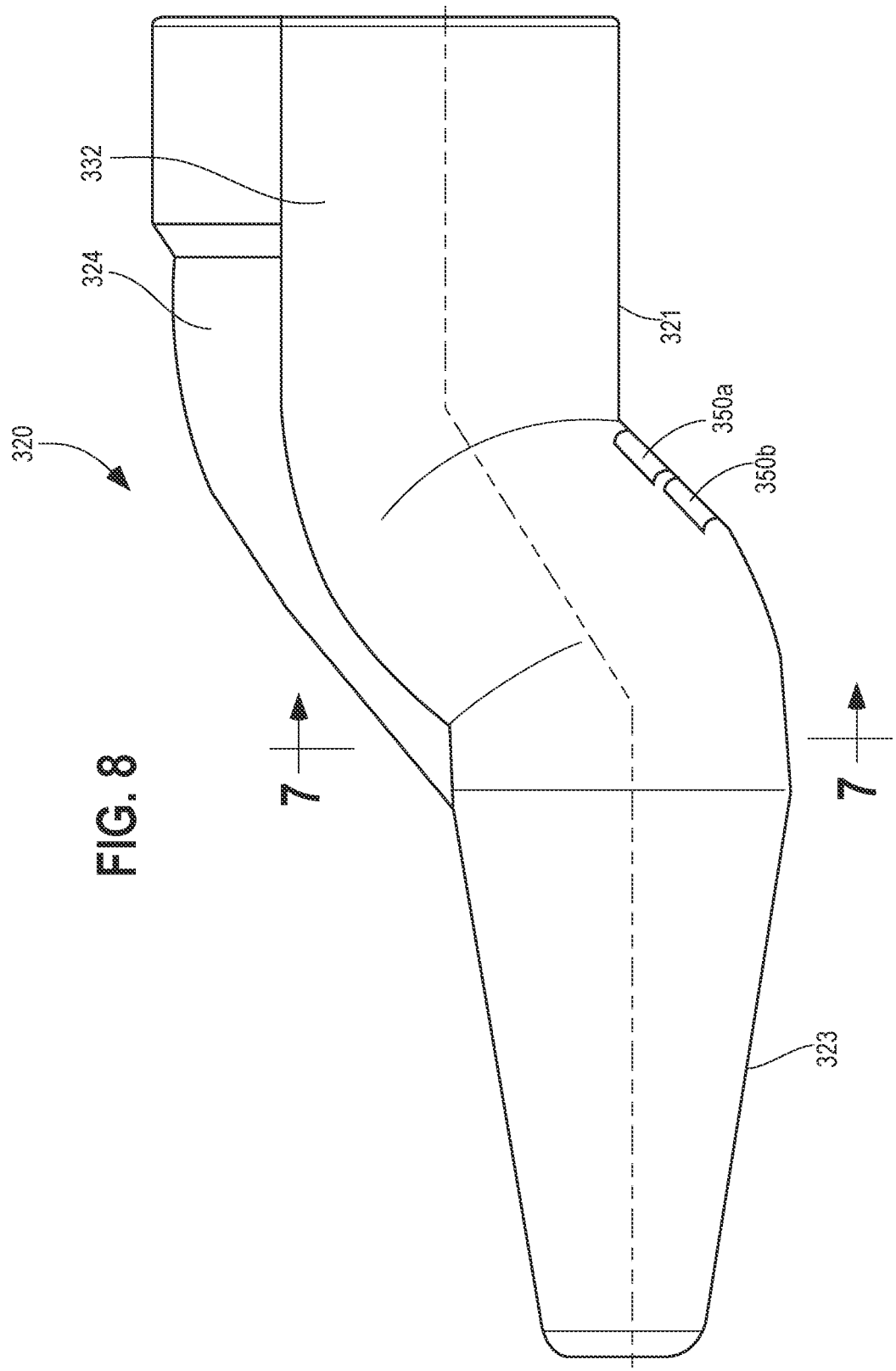
FIG. 8 is a side view of a spray nozzle according to another embodiment.
Figure 9:
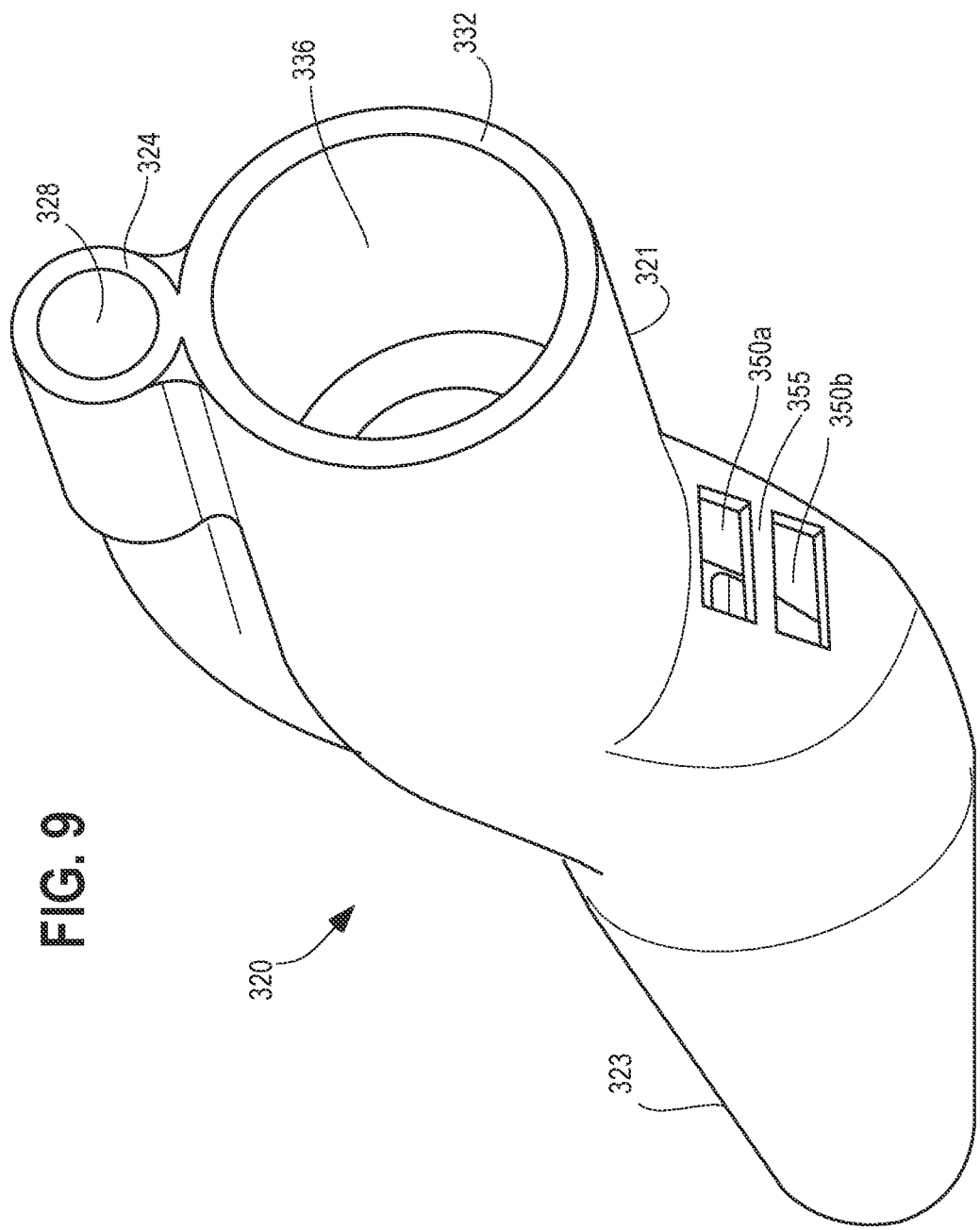
FIG. 9 is a perspective side-rear view of the nozzle of FIG. 8.
Figure 10:
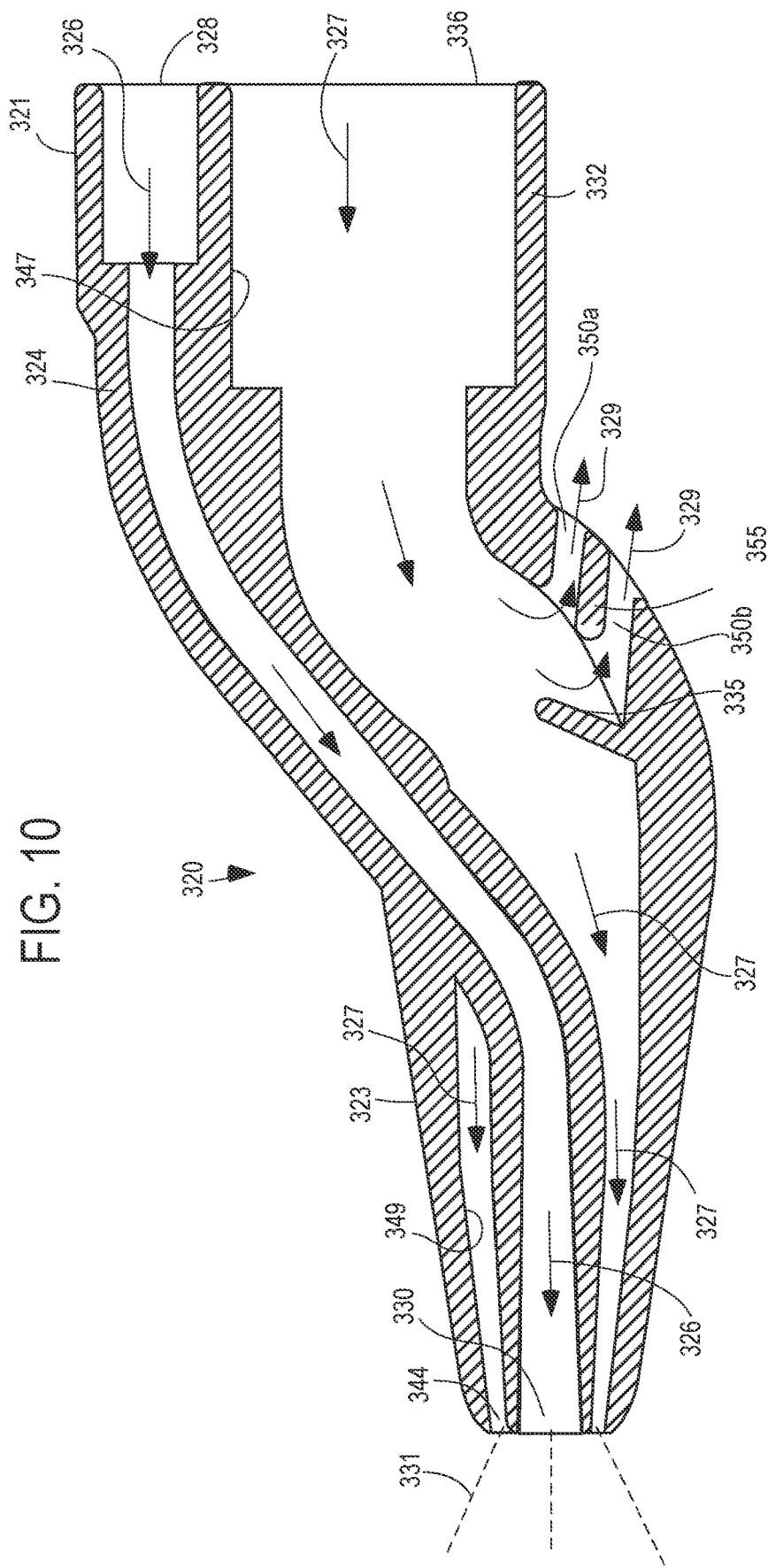
FIG. 10 is a cross-sectional view of the nozzle of FIG. 8.

FIGS. 8-10 illustrate several views (i.e., a front perspective, bottom, and cross-sectional, respectively) of an atomizing spray nozzle 320 according to a different embodiment. The spray nozzle 320 has an overall construction that has similarities to the construction of the above-discussed atomizing spray nozzle 220, with some differences highlighted below. For ease of reference, aspects of the spray nozzle 320 that are similar to aspects of the spray nozzle 220 described above with reference to FIGS. 5-7 have been designated in FIGS. 8-10 with similar reference numbers, but prefaced with a "3" instead of "2."

The overall shape of the spray nozzle 320 is similar to the overall shape of the spray nozzle 220 in that the spray nozzle 320 has an upstream cylindrical portion 321 and a downstream tapered portion 323. However, the overall shape of the spray nozzle 320 is somewhat different from the overall shape of the spray nozzle 220 such that, while the central longitudinal axis of the spray nozzle 220 is in the shape of two intersecting lines that form an obtuse interior angle therebetween, the central longitudinal axis of the spray nozzle 320 is in the shape of three lines (horizontal, sloped, horizontal) as shown in FIG. 8. Similar to the spray nozzle 220, however, the spray nozzle 320 may have a single-piece body (which may be, for example, made by injection molding, 3-D printing, etc.), or may have a body formed from several separate pieces (akin to the nozzle 220 of FIG. 4) that are joined together.

Similar to the spray nozzle 220, the spray nozzle 320 includes a first inlet 328 and a second inlet 336, as well as a first conduit 324 and a second conduit 332. However, the location of the first inlet 328 of the spray nozzle 320 is different from the location of the first inlet 228 of the spray nozzle 220. As a result, while the first conduit 224 of the spray nozzle 220 extends from the first inlet 228 along the tapered portion 223 of the spray nozzle 220, but does not extend along the cylindrical portion 221 of the spray nozzle 220, the first conduit 324 of the spray nozzle 320 extends from the first inlet 328 along both the cylindrical portion 321 of the spray nozzle 320 and the tapered portion 323 of the spray nozzle 320. In other words, while the first inlet 228 of the spray nozzle 220 is located substantially downstream relative to the second inlet 236 of the spray nozzle 220, in the embodiment illustrated in FIGS. 8-10, the first inlet 328 of the spray nozzle 320 is substantially aligned with the second inlet 336 of the spray nozzle 320.

In particular, as can be seen in FIGS. 4-7, the first inlet 228 of the spray nozzle 220 extends outwardly relative to the downstream tapered portion 223 of the body of the spray nozzle 220 and fluidly couples to (and/or forms an integral part of) the downstream tapered portion 223 of the spray nozzle 220. FIG. 7 also shows that no portion of the first inlet 228 or the first conduit 224 extends along the cylindrical portion 221 of the spray nozzle 220. On the other hand, as shown in FIG. 9, the first inlet 328 of the spray nozzle 320 extends along the entire length of the cylindrical portion 321 of the spray nozzle 320 (but could extend along only a portion of the length of the cylindrical portion 321 of the spray nozzle 320, such that the first inlet 328 of the spray nozzle 320 would not be substantially aligned with the second inlet 336 of the spray nozzle 320). Similarly to the first conduit 224 of the spray nozzle 220, a portion of the first conduit 324 of the spray nozzle 320 extends along at least a portion of the length of and within the interior of the tapered portion 323 of the body of the spray nozzle 320, as shown in FIG. 10.

Similarly to the spray nozzle 220 of FIG. 7, a portion of the second conduit 332 of the spray nozzle of FIG. 10 extends around or circumferentially surrounds the first conduit 324, such that, along a portion of the length of the spray nozzle 320, the first conduit 324 is an inner conduit with a first diameter, and the second conduit 332 is an outer conduit with a second diameter that is larger than the first diameter. As pointed out above, the second conduit 332 does not have to circumferentially surround the first conduit 324, and the first and second conduits 324 and 332 may have a side-by-side or another spatial relationship.

Similarly to the spray nozzle 220, while the spray nozzle 320 of FIGS. 8-10 includes a first outlet 330 akin to the first outlet 130 of the spray nozzle 120 and a second outlet 344 akin to the second outlet 144 of the spray nozzle 120 of FIGS. 2-4, the spray nozzle 320 does not include a head akin to the head 142 of the spray nozzle 120. In addition, while the second conduit 132 of the spray nozzle 120 is generally cylindrical, the second conduit 332 of the spray nozzle 320 includes a cylindrical portion 347 and a tapered portion 349. The cylindrical portion 347 is located upstream of the tapered portion 349. The tapered portion 349 is located downstream of the cylindrical portion 347 and upstream of the dispensing aperture 344, and the diameter of the tapered portion 349 decreases in the downstream direction (i.e., the diameter of the tapered portion 349 is largest proximally to the cylindrical portion 347 and smallest proximally to the dispensing aperture 344).

Also like the spray nozzle 220 and unlike the spray nozzle 120, the spray nozzle 320 does not have a plenum chamber akin to the plenum chamber 145 of the spray nozzle 120. Instead, the second fluid (e.g., a gas or a mixture of gases) flows through the second conduit 332 of the spray nozzle 320 in a direction indicated by the arrows 327 and is ejected from the second outlet 344, together with the first fluid (e.g., liquid or slurry) that flows through the first outlet 328 and is (substantially simultaneously) ejected from the first outlet 330 and mixed with the ejected second fluid to form an atomized multiphase spray 331. In other words, like the first outlet 230 and the second outlet 244 of the spray nozzle 220, the first outlet 330 and the second outlet 344 of the spray nozzle 320 provide openings through which the first and second types of fluid are respectively are atomized and ejected to form the two-phase mixture 331 of liquid/slurry droplets in a carrier gas that is delivered from the spray nozzle 320 onto one or more surfaces 107 of the target engine (e.g., aircraft engine) component 105 (e.g., as a protective coating, or as a pressurized liquid spray, etc.). Like the spray nozzle 220, the spray nozzle 320 can apply the spray 331, which is a two-phase spray mixture of liquid droplets in a carrier gas, onto a surface 107 of an engine component 105 at pressures of ten to three hundred pounds per square inch.

Also similarly to the spray nozzle 220, the spray nozzle 320 is configured such that the first outlet 330 and the second outlet 344 eject the first and second types of fluid, respectively, to form the multiphase mixture spray 331, which is dispersed in directions (indicated by the dashed lines in FIG. 10) that are parallel to the central longitudinal axis and/or extend radially away from the central longitudinal axis of the spray nozzle 320. Also similarly to the first outlet 230 and second outlet 244 of the spray nozzle 220, the first outlet 330 and second outlet 344 of the spray nozzle 320 may each have a diameter that is sufficiently small to enable the first outlet 330 and the second outlet 344 to atomize the first and second types of fluid, respectively, as they are ejected from the spray nozzle 330 to form the multi-phase spray mixture of the slurry/liquid droplets in the carrier gas.

Like the spray nozzle 220, the spray nozzle 320 includes structural features that balance the spray forces to restrict undesired deflection/deviation of the spray nozzle 320 and advantageously maintain position accuracy of the spray nozzle 320 and the distal end 111 of the robotic arm 110 during the spraying of the multiphase spray 331 from the spray nozzle 320. Unlike the spray nozzle 120 which includes two pairs of balancing outlets, i.e., 150a, 150b and 150c, 150d, and like the spray nozzle 220, the spray nozzle 320 includes one pair of balancing outlets 350a, 350b (also referred to as "retro-jets"), which help achieve the spray nozzle 320 this advantageous force balance, thereby advantageously avoiding both significant deflection and deviation of the distal end of the robotic arm 110 and the spray nozzle 320 from their intended spraying positions.

In particular, like the spray nozzle 220, the spray nozzle 320 includes a first balancing outlet 350a and a second balancing outlet 350b. Like the balancing outlets 250a-250d of the spray nozzle 220, the balancing outlets 350a-350b of the spray nozzle 320 are oriented in a generally opposite direction relative to the direction of the first outlet 330 and second outlet 344. In other words, while the first outlet 330 and second outlet 344 are oriented such that they emit the first and second types of fluid, respectively, to mix and form the atomized multiphase spray 331 in a generally forward or downstream direction relative to the first outlet 330 and second outlet 344, the balancing outlets 350a-350b are oriented such that they emit the balancing jets 329 of fluid (e.g., air) therefrom in a rearward or upstream direction relative to the first outlet 330 and second outlet 344 (as shown by the directional arrows 329 in FIG. 10).

Similarly to the balancing outlets 250a-250b of the spray nozzle 220, the balancing outlets 350a-350b of the spray nozzle 320 are in fluid communication with the second conduit 332 such that the second type of fluid (e.g., air or nitrogen gas, etc.) emitted from the balancing outlets 350a-350b of the spray nozzle 320 is the same fluid that is fed into the second inlet 336 of the second conduit 332 from the first gas source 192 via the first main line 193. Also similarly to the balancing outlets 250a-250b of the spray nozzle 220, the balancing outlets 350a-350b of the spray nozzle 320 are not in fluid communication with the first conduit 324 of the spray nozzle 320 such that the first type of fluid (e.g., coating slurry, cleaning solution, etc.) is restricted from being emitted from the balancing outlets 350a-350b of the spray nozzle 320.

Like the balancing outlets 250a-250b of the spray nozzle 220, the balancing outlets 350a-350d of the spray nozzle 320 are sized, shaped, and oriented at certain angles relative to the central longitudinal axis of the spray nozzle 320 to provide optimal balancing of the forces of the fluids passing through the spray nozzle 320 and being sprayed from the spray nozzle 320. In the embodiment illustrated in FIG. 10, the balancing outlets 350a, 350b are separated from each other by a partition wall 355 that is angled relative to the central longitudinal axis of the spay nozzle 320 to provide the desired flow of the retro-jets 329 through the balancing outlets 350a, 350b and the desired force balancing of the fluids passing through and being ejected from the spray nozzle 320. It will be appreciated that the angle of the partition wall 355 shown in FIG. 10 is shown by way of example only, and that the partition wall 355 may be angled differently in alternative embodiments. Furthermore, while the spray nozzle 320 is shown with two balancing outlets 350a, 350b, it will be appreciated that, in some embodiments, the spray nozzle 320 may have more than two balancing outlets (e.g., 4 (or more) balancing outlets). In the embodiment illustrated in FIG. 10, the spray nozzle 320 includes a wall 335 extending inwardly into the second conduit 332. The wall 335 is sized and angled (the size and inclination of the wall 335 in FIG. 10 are exemplary) to divert some of the second fluid flow (indicated by directional arrows 327) in second conduit 332 toward the balancing outlets 350a-350b.

Figure 11:
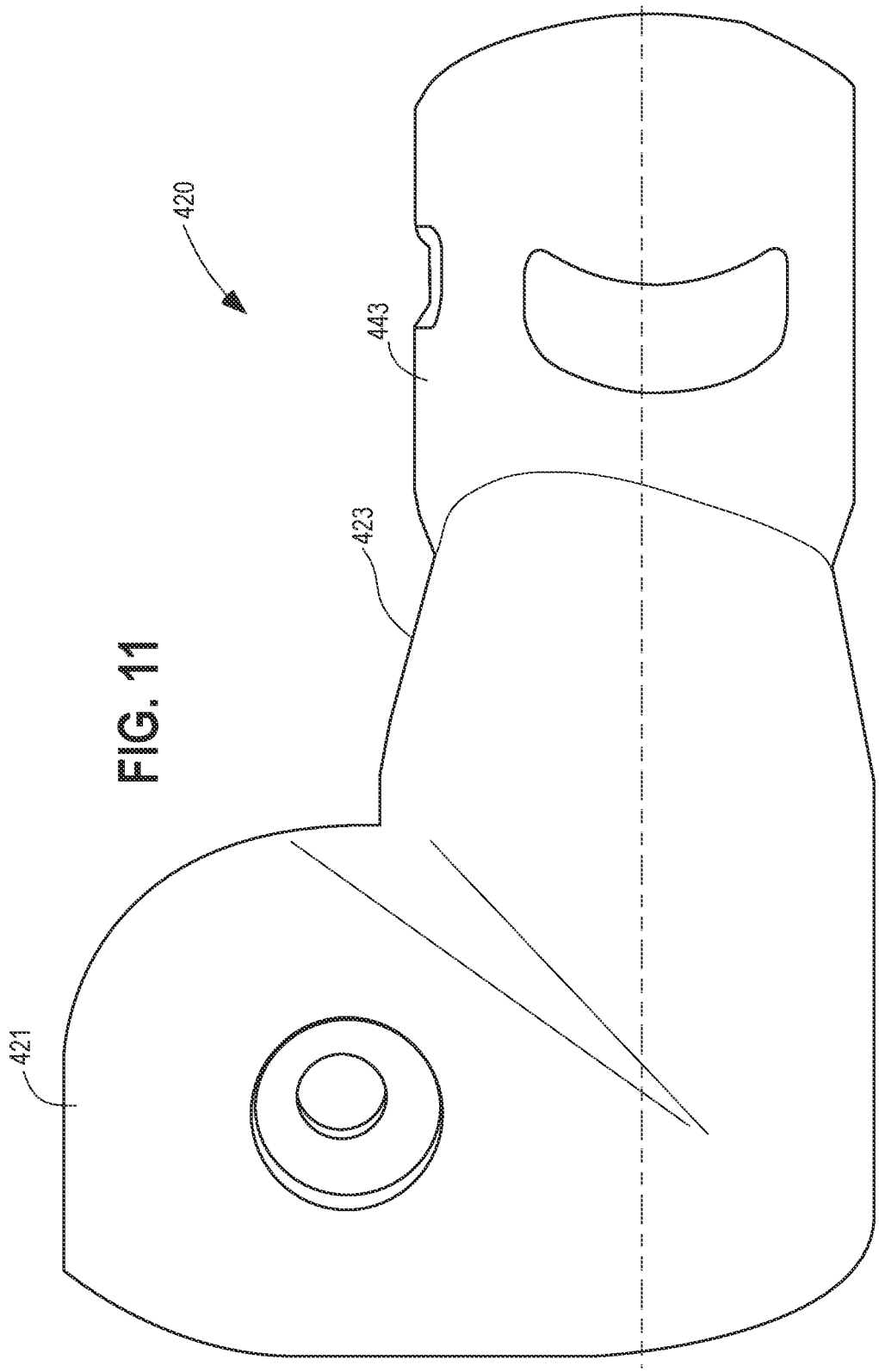
FIG. 11 is a side view of a spray nozzle according to another embodiment.
Figure 12:
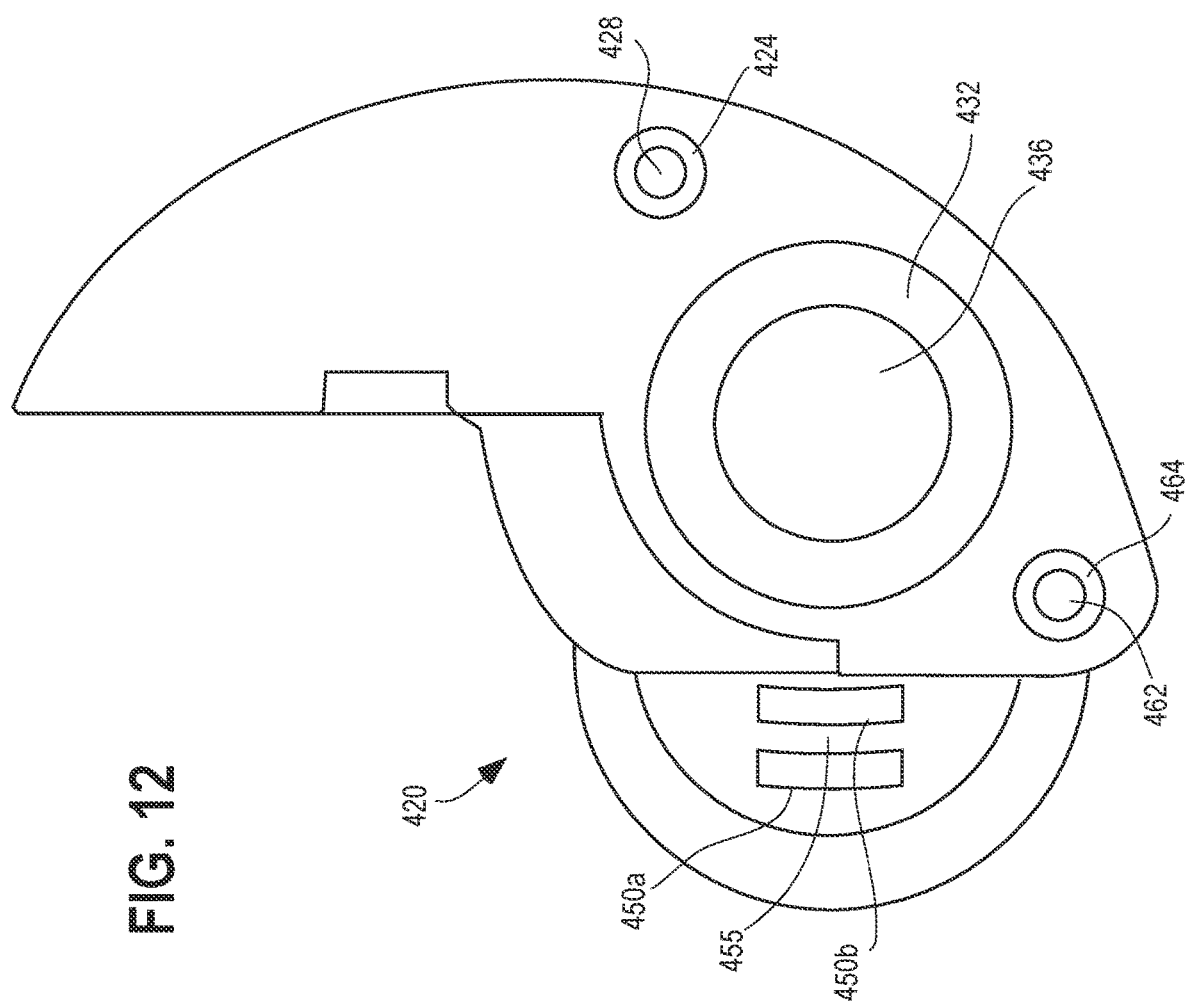
FIG. 12 is a rear view of the nozzle of FIG. 11.
Figure 13:
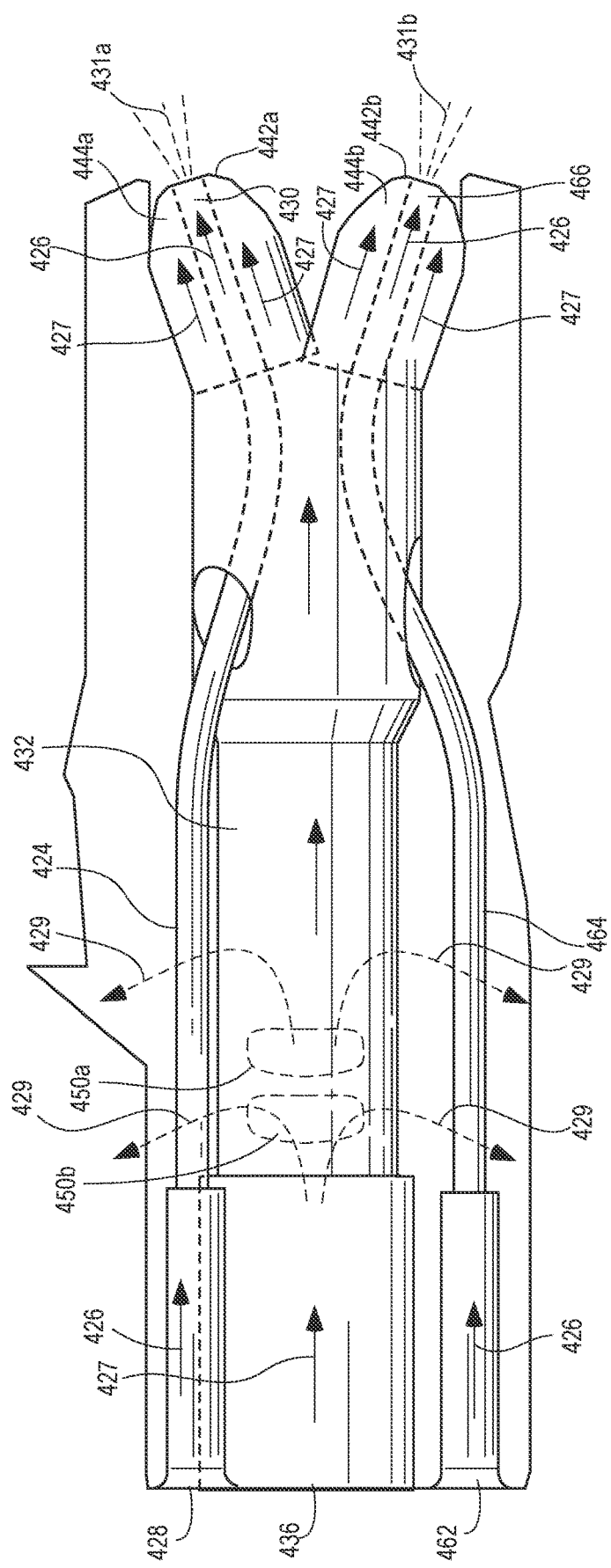
FIG. 13 is a partial cross-sectional schematic view of an interior environment of the nozzles of FIGS. 11 and 12.

FIGS. 11-13 illustrate several views (i.e., a front perspective, bottom, and cross-sectional, respectively) of an atomizing spray nozzle 420 according to a different embodiment. The spray nozzle 420 has an overall construction that has similarities to the construction of the above-discussed atomizing spray nozzles 120, 220, and 320, with some differences highlighted below. For ease of reference, aspects of the spray nozzle 420 that are similar to aspects of the spray nozzles 120, 220, and 320 described above have been designated in FIGS. 11-13 with similar reference numbers, but prefaced with a "4" instead of a "1," "2," or "3."

The overall shape of the exemplary spray nozzle 420 is similar to the overall shape of the spray nozzle 320 in that the spray nozzle 420 has a cylindrical portion 421 and a tapered portion 423 downstream of the cylindrical portion 421. However, unlike the spray nozzle 320, the spray nozzle 420 further includes a second cylindrical portion 433 downstream of the tapered portion 423 as shown in FIG. 11. As discussed in more details below, a major difference between the spray nozzle 420 relative to the spray nozzle 120 described above is that the spray nozzle 120 has one head 142, while the spray nozzle 420 has two heads 442a and 442b. Similar to the spray nozzle 120, however, the spray nozzle 420 may have a single-piece body (which may be, for example, made by injection molding, 3-D printing, etc.), or may have a body formed from several separate pieces that are joined together.

Similar to the spray nozzle 320, the spray nozzle 420 includes a first inlet 428 and a second inlet 436, as well as a first conduit 424 and a second conduit 432. However, unlike, the spray nozzle 320, the spray nozzle 420 includes a third inlet 462 and a third conduit 464, as shown in FIG. 10. In other words, while each of spray nozzles 120, 220, and 320 include one conduit for conducting a first type of fluid (e.g., a solution, a slurry, or the like) and one conduit for conducting a second type of fluid (e.g., a gas or a mixture of gases), the spray nozzle 420 includes two conduits (i.e., 424 and 464) for conducting the first type of fluid (e.g., a solution, a slurry, or the like) and one conduit for conducting a second type of fluid (e.g., a gas or a mixture of gases)

Similarly to the first conduit 324 of the spray nozzle 320, the first conduit 424 of the spray nozzle 420 extends along an entire length of the spray nozzle 420. Also, similarly to the second conduit 332 of the spray nozzle 320, the second conduit 432 of the spray nozzle 420 extends along an entire length of the spray nozzle 420. In other words, the spray nozzle 420 is similar to the spray nozzle 320 in that the first inlet 428 of the spray nozzle 420 is substantially aligned with the second inlet 436 of the spray nozzle 420, and in that the first outlet 430 of the spray nozzle 420 is substantially aligned with the second outlet 444a of the head 442a of the spray nozzle 420. Notably, in the embodiment shown in FIG. 13, the third inlet 462 of the spray nozzle 420 is also substantially aligned with the second inlet 436 of the spray nozzle 420, and the third outlet 466 of the spray nozzle 420 is also substantially aligned with the first outlet 444b of the head 442b of the spray nozzle 420.

A similarity of the spray nozzle 420 of FIG. 13 to the spray nozzle 320 of FIG. 10 is that a portion of the second conduit 432 of the spray nozzle 420 extends around or circumferentially surrounds a portion of the first conduit 424, such that, along a portion of the length of the spray nozzle 420, the first conduit 424 is an inner conduit with a first diameter, and the second conduit 432 is an outer conduit with a second diameter that is larger than the first diameter. Notably, a portion of the second conduit 432 also extends around or circumferentially surrounds a portion of the third conduit 464, such that, along a portion of the length of the spray nozzle 420, the third conduit 464 is an inner conduit with a first diameter, and the second conduit 432 is an outer conduit with a second diameter that is larger than the first diameter. In other words, in the embodiment shown in FIG. 13, a portion of each of the second and third conduits 432, 464 extends side-by-side with and exteriorly relative to the second conduit 432 and a portion of each of the second and third conduits 432, 464 extends in an interior of and is enclosed by a portion of the second conduit 432.

Also like the spray nozzle 320 and unlike the spray nozzle 120, the spray nozzle 420 does not have a plenum chamber akin to the plenum chamber 145 of the spray nozzle 120. Instead, the second type of fluid (e.g., a gas or a mixture of gases) flows as shown by arrows 427 through the second conduit 432 of the spray nozzle 420 and is ejected from the second outlet 444a substantially simultaneously with the ejection of the first type of fluid (e.g., a liquid or a slurry through the first outlet 430 of the head 442a of the spray nozzle 420, after which the ejected atomized first and second types of fluids mix to form the atomized multiphase spray 431. Similarly to the spray nozzles 120 and 220, the first conduit 424 of the spray nozzle 420 extends from the first inlet 428 all the way to the first outlet 430 of the head 442a of the spray nozzle 420, such that the first type of fluid (e.g., an aqueous solution, a slurry, etc.) flows as shown by the arrows 426 through the first conduit 424 of the spray nozzle 420 and is ejected through the first outlet 430 substantially simultaneously with the second type of fluid (e.g., a gas or a mixture of gases)), which is ejected through the second outlet 444a of the head 442a of the spray nozzle 420. Notably, the third conduit 464 of the spray nozzle 420 extends from the third inlet 462 all the way to the third outlet 466 of the head 442b of the spray nozzle 420, such that the third type of fluid (e.g., an aqueous solution, a slurry, etc.) flows as shown by the arrows 426 through the third conduit 464 of the spray nozzle 420 and is ejected through the third 466 substantially simultaneously with the second type of fluid (e.g., a gas or a mixture of gases)), which is ejected through the second outlet 444b of the head 442b of the spray nozzle 420.

Like the first outlet 330 and second outlet 344 of the spray nozzle 320, each of the first outlet 430 and second outlet 444a of the head 442a of the spray nozzle 420 provides an opening through which the first and second fluids, respectively, are ejected and mixed to form an atomized two-phase spray 431a of liquid/slurry droplets in a carrier gas that is delivered from the head 442a of the spray nozzle 420 onto one or more surfaces 107 of the target engine (e.g., aircraft engine) component 105 (e.g., as a protective coating, or as a pressurized liquid spray, etc.). Like the spray nozzle 320, the head 442a of the spray nozzle 420 can apply the two-phase spray 431a of liquid droplets in a carrier gas at pressures of ten to three hundred pounds per square inch. Notably, each of the third outlet 466 and second outlet 444b of the head 442b of the spray nozzle 420 provides an opening through which the first and third fluids, respectively, are ejected and mixed to form an atomized two-phase spray 431b of liquid/slurry droplets in a carrier gas that is delivered from the head 442b of the spray nozzle 420 onto one or more surfaces 107 of the target engine (e.g., aircraft engine) component 105 (e.g., as a protective coating, or as a pressurized liquid spray, etc.). Like the spray nozzle 320, the head 442a of the spray nozzle 420 can apply the two-phase spray 431b of liquid droplets in a carrier gas at pressures of ten to three hundred pounds per square inch.

Also similarly to the spray nozzle 320, each of the heads 442a and 442b of the spray nozzle 420 is configured to eject the multiphase mixture spray 431a and 431b, respectively in directions (indicated by the three dashed lines 431a and 431b in FIG. 13) that are parallel to the central longitudinal axis and/or extend radially away from the central longitudinal axis of the spray nozzle 420. Also similarly to the first outlet 330 and 344 of the spray nozzle 320, each of the first outlet 430, second outlets 444a-b, and third outlet 466 of the spray nozzle 420 may have a diameter that is sufficiently small to enable each of the first outlet 430, second outlets 444*a*-*b*, and third outlet 466 to atomize the first, second, and third fluids upon their ejection from their respective first and second head 442*a* and 442*b*, after which the ejected fluids mix to form the multi-phase spray mixture of the slurry/liquid droplets in the carrier gas.

Like each of the above-described spray nozzles 120, 220, and 320, the spray nozzle 420 includes structural features that balance the spray forces to advantageously maintain position accuracy of the spray nozzle 420 and the distal end 111 of the robotic arm 110 during the spraying of the multi-phase spray from the spray nozzle 420. Unlike the spray nozzle 120, which includes two pairs of balancing outlets, i.e., 150*a*, 150*b* and 150*c*, 150*d*, and like the spray nozzles 220 and 320, the spray nozzle 420 includes one pair of balancing outlets (also referred to as "retro-jets"), which help achieve the spray nozzle 420 this advantageous force balance, thereby advantageously avoiding a significant deflection and deviation of the distal end of the robotic arm 110 and therefore the spray nozzle 420 from its intended spraying position.

In particular, like the spray nozzle 320, the spray nozzle 420 includes a first balancing outlet 450*a* and a second balancing outlet 450*b*. Like the balancing outlets 350*a*-350*b* of the spray nozzle 320, the balancing outlets 450*a*-450*b* of the spray nozzle 420 are oriented in a generally opposite direction relative to the direction of the first outlet 430, second outlets 444*a*-*b*, and third outlet 466 of the heads 442*a*-442*b* of the spray nozzle 420. In other words, as shown in FIG. 13, while the first outlet 430, second outlets 444*a*-*b*, and third outlet 466 of the first and second heads 442*a*-442*b* of the spray nozzle 420 are oriented such that they emit the atomized multiphase sprays 431*a*-431*b* in a generally forward or downstream direction relative to the heads 442*a*-442*b*, the balancing outlets 450*a*-450*b* are oriented such that they emit the balancing jets 429 of fluid (e.g., air) therefrom in a rearward or upstream direction (indicated by the dashed lines 429) relative to the heads 442*a*, 442*b*.

Similarly to the balancing outlets 350*a*-350*b* of the spray nozzle 320, the balancing outlets 450*a*-450*b* of the spray nozzle 420 are in fluid communication with the second conduit 432 such that the second type of fluid (e.g., a mixture of gases such as air, or nitrogen gas, etc.) emitted in the form of retro-jets 429 from the balancing outlets 450*a*-450*b* of the spray nozzle 420 is the same fluid that is fed into the second inlet 436 of the second conduit 432 from the first gas source 192 via the first main line 193. Also similarly to the balancing outlets 350*a*-350*b* of the spray nozzle 320, the balancing outlets 450*a*-450*b* of the spray nozzle 420 are not in fluid communication with the first conduit 424 such that the first type of fluid (e.g., coating slurry, cleaning solution, etc.) is restricted from being emitted from the balancing outlets 450*a*-450*b* of the spray nozzle 420.

Like the balancing outlets 350*a*-350*b* of the spray nozzle 320, the balancing outlets 450*a*-450*b* of the spray nozzle 420 are sized, shaped, and oriented at certain angles relative to the central longitudinal axis of the spray nozzle 420 to provide optimal balancing of the forces of the fluids passing through the spray nozzle 420 and being sprayed from the spray nozzle 420. In the embodiment illustrated in FIG. 12, the balancing outlets 450*a*, 450*b* are separated from each other by a partition wall 455 that is angled relative to the central longitudinal axis of the spray nozzle 420 to provide the desired flow of the retro-jets 429 (seen in FIG. 14) through the balancing outlets 450*a*, 450*b* and the desired force balancing of the fluids passing through and being ejected from the spray nozzle 420.

It will be appreciated that the angle of the partition wall 455 shown in FIG. 12 is shown by way of example only, and that the partition wall 455 may be angled differently in alternative embodiments. Furthermore, while the spray nozzle 420 is shown with two balancing outlets 450*a*, 450*b*, it will be appreciated that, in some embodiments, the spray nozzle 420 may have more than two balancing outlets (e.g., 4 (or more) balancing outlets).

Further aspects of the disclosure are provided by the subject matter of the following clauses:

A spray nozzle includes a first conduit that provides a first flow path for a first fluid, the first flow path including a first inlet and a first outlet; a second conduit that provides a second flow path for a second fluid that is different from the first fluid, the second flow path including a second inlet and a second outlet; a first head including the first outlet and second outlet that ejects therefrom a spray in a first direction, wherein the spray includes at least one of the first fluid and the second fluid; and at least one balancing outlet in fluid communication with the second conduit, the at least one balancing outlet configured to eject the second fluid as a balancing jet in a second direction, wherein the second direction is different from the first direction such that a spray force of ejection of the spray is at least partially offset by a balancing force of ejection of the balancing jet.

In the spray nozzle, the balancing force is generally opposite to the spray force.

In the spray nozzle, the at least one balancing outlet is not in fluid communication with the first flow path.

In the spray nozzle, the at least one balancing outlet includes a first pair of balancing outlets located on a first side of the spray nozzle and a second pair of balancing outlets located on a second side of the spray nozzle, and wherein the second conduit is in communication with the first pair of the balancing outlets and the second pair of the balancing outlets opposite to the first side.

The spray nozzle further includes a third conduit that provides a third flow path for the first fluid; and a second head that ejects therefrom the spray that includes the first fluid and the second fluid.

In the spray nozzle, the first conduit is in fluid communication with the first head; the second conduit is in fluid communication with the first head, the second head, and the at least two balancing outlets; and the third conduit is in fluid communication with the second head.

In the spray nozzle, the first fluid is a slurry and the second fluid is a at least one gas.

The spray nozzle includes a plenum chamber configured to receive the second fluid from the second conduit, the plenum chamber being in fluid communication with the first head and the at least one balancing outlet.

The spray nozzle further includes at least one sensor configured to measure flow within at least one of the first conduit and the second conduit; and transmit a signal to a control unit that controls at least one of a gas source, a valve, a fluid source, and a slurry source.

The spray nozzle further includes at least one sensor configured to detect a physical location, velocity, or acceleration of the spray nozzle; and transmit a signal to a control unit that controls at least one of a gas source, a valve, a fluid source, and a slurry source The spray nozzle may be a part of a spray nozzle assembly including: a fluid or slurry source configured to deliver the first fluid into the first inlet of the first conduit; a first gas source configured to deliver the second fluid into the second inlet of the second conduit; and a robotic arm having the spray nozzle coupled to an end thereof.

The spray nozzle may be coupled to the end of the robotic arm such that the spray nozzle is permitted to swivel in at least two directions relative to the end of the robotic arm.

The spray nozzle assembly may include at least one sensor configured to at least one of measure flow within at least one of the first conduit and the second conduit; and detect a physical location, velocity, or acceleration of the spray nozzle or of the robotic arm.

The spray nozzle assembly may further include a control unit that controls at least the first gas source, and wherein the at least one sensor is further configured to transmit a signal indicative of the physical location, velocity, or acceleration of the spray nozzle or of the robotic arm or the flow speed within the at least one of the first conduit and the second conduit to the control unit.

The control unit may be configured to increase or decrease an output of the first gas source in response to receipt of the signal from the at least one sensor.

The spray nozzle may comprise a third conduit that provides a third flow path for the second fluid or a third fluid different from the second fluid, and wherein the spray nozzle assembly further includes a second gas source configured to deliver the second fluid or the third fluid into the third conduit.

The control unit is configured to increase or decrease an output of the second gas source in response to receipt of the signal from the at least one sensor.

The robotic arm of the spray nozzle assembly may include multiple interconnected segments that permit the robotic arm to curve relative to a longitudinal axis of the robotic arm.

The robotic arm may have a hollow interior that permits both a first main line coupled to the fluid or slurry source and to the first inlet of the first conduit, and a second main line coupled to the first gas source and to the second inlet of the second conduit to pass therethrough.

A nozzle includes: a first conduit that provides a first flow path for a first fluid, the first flow path including a first inlet and a first outlet; a second conduit that provides a second flow path for a second fluid that is different from the first fluid, the second flow path including a second inlet and a second outlet; a third conduit that provides a third flow path for a third fluid that is different from the first fluid and from the second fluid, the third flow path including a third inlet and a third outlet; a first head including the first outlet and the second outlet that ejects therefrom a spray in a first direction that includes at least one of the first fluid and the second fluid; and at least one balancing outlet in fluid communication with at least the third conduit, the at least one balancing outlet configured to eject the third fluid therefrom as a balancing jet in a second direction, wherein the second direction is different from the first direction such that a spray force of ejection of the spray is at least partially offset by a balancing force of ejection of the balancing jet.

The above described exemplary embodiments advantageously include balancing outlets (retro-jets) that eliminate the need for structural anchoring of the spray nozzle and permit the spray nozzle to be coupled to an elongated slender robotic arm while relying on balancing the reaction forces within the spray nozzle by using one or more of the active fluids to exert a balancing force by exiting through one or more of the force balancing outlets.

Those skilled in the art will recognize that a wide variety of other modifications, alterations, and combinations can also be made with respect to the above described embodiments without departing from the scope of the disclosure, and that such modifications, alterations, and combinations are to be viewed as being within the ambit of the inventive concept.

What is claimed is:

1. A spray nozzle, comprising:
   a first conduit that provides a first flow path for a first fluid, the first flow path including a first inlet and a first outlet;
   a second conduit that provides a second flow path for a second fluid that is different from the first fluid, the second flow path including a second inlet and a second outlet;
   a first head including the first outlet and second outlet that ejects therefrom a spray in a first direction, wherein the spray includes at least one of the first fluid and the second fluid; and
   at least one balancing outlet in fluid communication with the second conduit, the at least one balancing outlet configured to eject the second fluid as a balancing jet in a second direction, wherein the second direction is different from the first direction such that a spray force of ejection of the spray is at least partially offset by a balancing force of ejection of the balancing jet.

2. The spray nozzle of claim 1, wherein the balancing force is generally opposite to the spray force.

3. The spray nozzle of claim 1, wherein the at least one balancing outlet is not in fluid communication with the first flow path.

4. The spray nozzle of claim 1, wherein the at least one balancing outlet includes a first pair of balancing outlets located on a first side of the spray nozzle and a second pair of balancing outlets located on a second side of the spray nozzle, and wherein the second conduit is in communication with the first pair of the balancing outlets and the second pair of the balancing outlets opposite to the first side.

5. The spray nozzle of claim 1, further comprising:
   a third conduit that provides a third flow path for the first fluid; and
   a second head that ejects therefrom the spray that includes the first fluid and the second fluid.

6. The spray nozzle of claim 5, wherein:
   the first conduit is in fluid communication with the first head;
   the second conduit is in fluid communication with the first head, the second head, and the at least one balancing outlet; and
   the third conduit is in fluid communication with the second head.

7. The spray nozzle of claim 1, wherein:
   the first fluid is a slurry and the second fluid is a at least one gas.

8. The spray nozzle of claim 1, further comprising a plenum chamber configured to receive the second fluid from the second conduit, the plenum chamber being in fluid communication with the first head and the at least one balancing outlet.

9. The spray nozzle of claim 1, further comprising at least one sensor configured to:
   measure flow within at least one of the first conduit and the second conduit; and
   transmit a signal to a control unit that controls at least one of a gas source, a valve, a fluid source, and a slurry source.

10. The spray nozzle of claim 1, further comprising at least one sensor configured to:

detect a physical location, velocity, or acceleration of the spray nozzle; and transmit a signal to a control unit that controls at least one of a gas source, a valve, a fluid source, and a slurry source.

11. A spray nozzle assembly comprising:
a spray nozzle, the spray nozzle including:
   a first conduit that provides a first flow path for a first fluid, the first flow path including a first inlet and a first outlet;
   a second conduit that provides a second flow path for a second fluid that is different from the first fluid, the second flow path including a second inlet and a second outlet;
   a first head including the first outlet and second outlet that ejects therefrom a spray in a first direction, wherein the spray includes at least one of the first fluid and the second fluid; and
   at least one balancing outlet in fluid communication with the second conduit, the at least one balancing outlet configured to eject the second fluid as a balancing jet in a second direction, wherein the second direction is different from the first direction such that a spray force of ejection of the spray is at least partially offset by a balancing force of ejection of the balancing jet;
a fluid or slurry source configured to deliver the first fluid into the first inlet of the first conduit;
a first gas source configured to deliver the second fluid into the second inlet of the second conduit; and
a robotic arm having the spray nozzle coupled to an end thereof.

12. The spray nozzle assembly of claim 11, wherein the spray nozzle is coupled to the end of the robotic arm such that the spray nozzle is permitted to swivel in at least two directions relative to the end of the robotic arm.

13. The spray nozzle assembly of claim 11, wherein the spray nozzle further comprises at least one sensor configured to at least one of:
   measure flow within at least one of the first conduit and the second conduit; and
   detect a physical location, velocity, or acceleration of the spray nozzle or of the robotic arm.

14. The spray nozzle assembly of claim 13, further comprising a control unit that controls at least the first gas source, and wherein the at least one sensor is further configured to transmit a signal indicative of the physical location, velocity, or acceleration of the spray nozzle or of the robotic arm or the flow speed within the at least one of the first conduit and the second conduit to the control unit.

15. The spray nozzle assembly of claim 14, wherein the control unit is configured to increase or decrease an output of the first gas source in response to receipt of the signal from the at least one sensor.

16. The spray nozzle assembly of claim 14, wherein the spray nozzle comprises a third conduit that provides a third flow path for the second fluid or a third fluid different from the second fluid, and wherein the spray nozzle assembly further includes a second gas source configured to deliver the second fluid or the third fluid into the third conduit.

17. The spray nozzle assembly of claim 16, wherein the control unit is configured to increase or decrease an output of the second gas source in response to receipt of the signal from the at least one sensor.

18. The spray nozzle assembly of claim 11, wherein the robotic arm comprises multiple interconnected segments that permit the robotic arm to curve relative to a longitudinal axis of the robotic arm.

19. The spray nozzle assembly of claim 11, wherein the robotic arm has a hollow interior that permits both a first main line coupled to the fluid or slurry source and to the first inlet of the first conduit, and a second main line coupled to the first gas source and to the second inlet of the second conduit to pass therethrough.

20. A nozzle comprising:
a first conduit that provides a first flow path for a first fluid, the first flow path including a first inlet and a first outlet;
a second conduit that provides a second flow path for a second fluid that is different from the first fluid, the second flow path including a second inlet and a second outlet;
a third conduit that provides a third flow path for a third fluid that is different from the first fluid and from the second fluid, the third flow path including a third inlet and a third outlet;
a first head including the first outlet and the second outlet that ejects therefrom a spray in a first direction that includes at least one of the first fluid and the second fluid; and
at least one balancing outlet in fluid communication with at least the third conduit, the at least one balancing outlet configured to eject the third fluid therefrom as a balancing jet in a second direction, wherein the second direction is different from the first direction such that a spray force of ejection of the spray is at least partially offset by a balancing force of ejection of the balancing jet.

* * * * *